US009123232B1

(12) United States Patent
Chan

(10) Patent No.: US 9,123,232 B1
(45) Date of Patent: Sep. 1, 2015

(54) TELEPHONE REASSURANCE, ACTIVITY MONITORING AND REMINDER SYSTEM

(71) Applicant: Henry Sik-Keung Chan, Westlake Village, CA (US)

(72) Inventor: Henry Sik-Keung Chan, Westlake Village, CA (US)

( * ) Notice: Subject to any disclaimer, the term of this patent is extended or adjusted under 35 U.S.C. 154(b) by 0 days.

(21) Appl. No.: 13/999,612

(22) Filed: Mar. 11, 2014

(51) Int. Cl.
*H04M 11/04* (2006.01)
*G08B 21/22* (2006.01)

(52) U.S. Cl.
CPC .................................... *G08B 21/22* (2013.01)

(58) Field of Classification Search
CPC ......... H04L 67/18; H04L 67/22; H04W 4/02; G06Q 10/1095; G06Q 50/265
USPC ........... 379/38, 39, 40, 41, 45, 46, 48, 49, 50, 379/51, 42; 700/244; 340/286.06, 286.07, 340/309.16, 539.11, 539.12, 573.4; 221/9
See application file for complete search history.

(56) References Cited

U.S. PATENT DOCUMENTS 4,743,892 A * 5/1988 Zayle ......................... 340/573.4
5,333,173 A * 7/1994 Seazholtz et al. ............... 379/45
5,657,236 A * 8/1997 Conkright ..................... 700/244
5,703,786 A * 12/1997 Conkright ..................... 700/244
5,850,344 A * 12/1998 Conkright ..................... 700/231
6,728,341 B1 * 4/2004 Puchek et al. .................. 379/49
7,091,865 B2 * 8/2006 Cuddihy et al. ........... 340/573.1
7,519,163 B2 * 4/2009 Cameron et al. ................ 379/38
8,718,594 B2 * 5/2014 Braznell .................... 455/404.1
8,831,635 B2 * 9/2014 Haney ........................ 455/456.2
2006/0161295 A1 * 7/2006 Yun ............................... 700/236
2009/0076852 A1 * 3/2009 Pierson et al. .................... 705/3
2010/0286490 A1 * 11/2010 Koverzin ...................... 600/301
2010/0295656 A1 * 11/2010 Herickhoff et al. ............ 340/3.1
2014/0019184 A1 * 1/2014 Herickhoff et al. .......... 705/7.19

* cited by examiner

*Primary Examiner* — Binh Tieu

(57) ABSTRACT

A communication apparatus and method to provide timed monitoring and reminder function using a telephone switch to make calls to a subscriber with the option to repeat each call one or more times to allow the subscriber to answer any one of the calls to signal activity. If the subscriber is not responding to any one of the calls, the apparatus will communicate to someone related to the subscriber such as a friend or a member of the family to report the subscriber's inactivity. Alternatively, the subscriber can signal activity before the call occurs to avoid the call. Allowing a subscriber multiple opportunities to respond to a call and to take action proactively is an improvement over existing methods to provide telephone reassurance. With switches and motion sensors connecting to a phone device to initiate and to respond to phone calls, the apparatus can be used effectively as an alert system where motion or movement of an object serves as a trigger to report or to suppress the reporting of an event that is of concern to the subscriber and others who share the subscriber's interests.

16 Claims, 13 Drawing Sheets

FIG. 11a 1100 1102 1104 1106 1108

| Field1 | Field2 | Field3 | Field4 | Field5 |
|---|---|---|---|---|
| 3017 | 0 | 3000 | 0 | |
| 18055514880@careringer | 0 | 3000 | 0 | |
| 3000 | 0 | 18055514880@careringer | 0 | |
| 8310330@ovislink | 0 | 3000 | 0 | |
| 3017 | 0 | repeat1 | 0 | |
| 3000 | 0 | repeat1 | 0 | |
| 3000 | 0 | repeat1 | 0 | |
| 18055514880@careringer | 0 | 18055514880@careringer | 0 | myemail@gmail.com |

1110 1112 1114 1116 1118 1120 1122 1124

FIG. 11b 1126 1128

| Field1 | Field2 |
|---|---|
| 8055514880 | job 1525 at Tue Mar 4 21:35:00 2014 |
| 3017 | job 1526 at Wed Mar 5 11:00:00 2014 |

1130 1132

FIG. 11c

Connected.
Logged in.
ActionID: 301705131600
ActionID: 301705131600
Failed NoAnswer 3017 3600a autodial_CheckBack 0 5 0 2014 03 05 13 16 00
Connected.
Logged in.
ActionID: 300005131655
ActionID: 300005131655
Success Answered 3000 3600a autodial_UrgentCall 3017 0 0 2014 03 05 13 16 55

FIG. 11d

Failed NoAnswer 3017 3600a autodial_CheckBack 0 5 0 2014 03 05 11 16 00
Success Answered 3000 3600a autodial_UrgentCall 3017 0 0 2014 03 05 11 16 56

TELEPHONE REASSURANCE, ACTIVITY MONITORING AND REMINDER SYSTEM

CROSS REFERENCE TO RELATED APPLICATIONS

This application claims the benefit of provisional patent application, Ser. No. 61/851,950, filed 2013 Mar. 14 by the present inventor.

BACKGROUND AND SUMMARY

1. Field of Invention

This invention relates to senior services, specifically using telephone reassurance, activity monitoring and reminder to address safety issues to maintain health and wellbeing.

2. Background

For many years, outreach telephone calls have been used to provide reassurance. Community organizations have been using such a service to care for their seniors living an independent lifestyle. Computer systems are currently being used to assist with the call functions, such as using a phone system to make calls to a list of numbers according to a schedule, using a pre-recorded message for introduction. It detects whether each call is answered and uses the call status to provide information for follow-ups. In certain existing call center arrangements, manned positions will make calls to those who are not responding to a first call, and refer safety concerns to the appropriate agency to escalate. With such manned positions, it is difficult, if not impractical, to make multiple calls to the same subscriber. Thus, one missed call can result in needless alerts.

An alternative is to bypass the call center and convey the call status directly to friends and family to alert them of possible emergency. Automating the communication, leveraging friends and family for support of the seniors would allow the service to deploy to a larger scale. This mode of operation is impersonal and hence unobtrusive to the subscribers and people who have an interest in their wellbeing. Even with such systems, the subscriber is still required to stay close to the phone device at the time of the call to respond to the call. Most subscribers feel the need to be in close proximity to the phone to be certain they do not miss the call. This requirement could be a cause for rejection of the system and even induce anxiety in the subscriber over time.

This invention incorporates solutions to address the psychological burden that limits the use of such systems, including but not limited to: 1) methods to schedule reassurance calls, 2) methods to cancel scheduled calls and 3) methods to confirm a subscriber's state of being. Following is a summary of the methods and apparatus and how they are utilized in a telephone reassurance embodiment and other related embodiments.

Reassurance-Call-Request Program

Reassurance calls are requested using a reassurance-call-request (RCR). RCR is a computer program (program) which, when executed on a target processor (microprocessor), sends a request to the system to call a subscriber at a predetermined future time. If the call is not answered by the subscriber, the computer program will process a file and action according to the instructions in the file.

Off-Hook Signal

A call is answered when an off-hook signal (OHS) is received by the call supervision function of a telephone switch within a reasonable time (e.g. 5 seconds). This is to be interpreted as someone picking up the handset of a phone device. In a telephone reassurance embodiment (e.g. daily call to a person to offer reassurance), an OHS signifies subscriber activity in response to a reassurance call.

Job Scheduler Program

A RCR can be scheduled to run at some predetermined future time using a job scheduler program (JSP). JSP also allows reassurance calls to be repeated (e.g. daily) over a period of time or indefinitely until they are removed from the job schedule.

Service-Request-Number

A service-request-number (SRN) is a telephone number whereby a subscriber can call this number to schedule a reassurance call. More than one SRN, each registered to a different phone service provider, will answer calls from a phone device registered to the same service provider. Thus, the system can accommodate a subscriber population served by a number of service providers utilizing different technology to provide their phone service.

Time Code

When a subscriber device calls a SRN, the system will prompt the subscriber for a time code (time-code), which translates to a lead time (lead-time) to wait before the next reassurance call. Lead-time provides a time buffer for the subscriber to get ready for the next reassurance call, and to cancel the scheduled RCR prior to the occurrence of the next reassurance call if so desired.

Autodialer

Autodialer is a device used to automatically dial a SRN. In this operation, the time-code used is a function of the SRN.

Analog Telephone Adapter

An analog telephone adaptor (ATA) is a microprocessor-based phone device whereby an analog telephone connected to an ATA can communicate to a telephone switch using an Internet connection. Some ATA has an autodialer function and could be used in place of a standalone autodialer.

Cancel a Scheduled Call

A subscriber can call a SRN and enter a command to cancel all reassurance call(s) scheduled for the subscriber device. As such, a subscriber can call in early to signal activity without having to wait for the reassurance call to occur to respond.

When a confirmation is needed, a subscriber can choose to schedule another reassurance call in the near future. By default, the system will clear all previously scheduled calls. When the next reassurance call occurs, the subscriber is assured that there are no more pending requests for reassurance call in the system.

Further, the time during which a subscriber can call in early to cancel or to reschedule a reassurance call can be individually defined for each subscriber.

Call-Request-Switch

A call-request switch (CRS) is a switch used to activate the autodial function from an autodialer to request a reassurance call. When the set up is used for monitoring activity, the presence of activity, causing the switch to operate, will result in a call for attention.

A CRS can also be used to activate the autodial function from an autodialer to cancel a scheduled reassurance call. When the set up is used for monitoring inactivity where the absence of activity over a time period will result in a call for attention, the presence of activity, in this case, will cancel the scheduled call.

Call-Answer-Switch

A call-answer-switch (CAS) is used to answer a call when the switch is in the closed position. The device can be used to respond to a phone call to signal activity. For example, a switch built into a pill box whereby opening the pill box sends an OHS in response to a reassurance call.

SNOOZE

When a reassurance call is answered, the subscriber can choose to enter a command to request the reassurance call to repeat at some future time (SNOOZE.) Using SNOOZE is easier then scheduling a new call, when on-going monitoring over a period of time is required.

Auto-SNOOZE

If the reassurance call is not answered the first time, the system automatically repeats the call (Auto-SNOOZE) for a predetermined number of future times, separated by a lead-time. Auto-SNOOZE can be defined specifically for each subscriber. The Auto-SNOOZE feature is intended to allow additional opportunities for the subscriber to answer the call, in case the last call was missed for some trivial reason, to reduce the chance of a false alarm.

Seniors will find this feature useful when they are away from the phone device at the time when the reassurance call occurs. They will feel more relaxed when they know they will have another chance to answer the call later so there will be no need for them to hurry or wait by the phone to avoid needless alerts being sent to their friends or family. Yet, they are assured that when all the repeating check-in calls are missed their friends or family members will still be notified.

When Auto-SNOOZE is used with a pill box reminder call, the initial reassurance call(s) serves only as a reminder. The subscriber can take his or her time to reach for the pill box knowing that not responding to the initial reminder calls will not result in a false alarm.

The Auto-SNOOZE setup reduces the chance of needless alerts. People with minor hearing loss could find Auto-SNOOZE an invaluable addition to a telephone reassurance system.

Check-in Call

The invention and its embodiments can be used in whole or in part in a telephone reassurance service.

The following mechanized functions are performed by the service.

- Daily call to check in on the seniors according to a schedule of their choosing
- If the reassurance call goes unanswered, friends and family members supporting them will get the call notifications or email communications In one embodiment, reassurance calls are scheduled as daily calls.

In another embodiment, a subscriber calls early to cancel a scheduled reassurance call. A subscriber may not want to wait to answer the reassurance call. In a way, this method gives them the option to announce their presence (check-in) in advance of the call.

In another embodiment, the invention provides a means for subscribers to self-monitor themselves, by using their phone device to schedule reassurance calls and use SNOOZE to repeat the call until it is no longer needed.

When a caregiver has to be away from their client, they can rely on SNOOZE to provide relief, knowing that they will be notified if their client is not answering the phone.

This utility is not limited to the care of seniors living alone, but also has many other applications including providing reassurance to individuals while alone and feeling vulnerable at times. With this utility, they know they can rely on their friends and family to look out for them. By calling a SRN and entering a time-code covering the vulnerable period, they will find peace of mind knowing their friends and family will get a message about their state of being if anything unexpected happens to them. Later, they simply call the SRN again to end the call request when they no longer need the monitoring for reassurance.

Adjunct Security System

In another embodiment, the RCR is used to generate phone calls to

- report an intrusion based on motion detection, and to
- trigger an alarm when used in conjunction with a home security system equipped with an alarm A CRS operates a contact when motion is detected by a motion sensor. The contact triggers a request for reassurance call from a subscriber device. When the reassurance call is not answered, the activity is communicated to the subscriber and other people involved.

Some sensors used for security system are sensitive to the voltage change caused by the phone call signals. The siren of a security alarm can be activated using a phone line wired to one such sensor.

Since the alarm goes off only when no one is around to answer the reassurance call, false alarms can be avoided by answering the call to void the call to the alarm.

Pill Box Reminder

As a growing number of people rely on medication and supplements to maintain their physical health, there is an increased need for a reminder service to help people to adhere to a regimen. The idea is an assistive technology to alert someone to take action only when they forget. Assuming one has to be reminded to take medicine from a pill box according to a schedule, opening the pill box during certain day and time of the day will cancel a scheduled call timed for the reminder. Thus, the reminder call occurs only when it is necessary. This method is unobtrusive and does not burden the subscriber with the need to learn the operation of yet another piece of equipment.

When the subscriber is not responsive to the reminder call, the system will call members of the family or friends to alert them of the concern. When family members do not receive calls from the system, they can be assured that the subscriber remembers his or her medication requirements.

Inactivity Minder

The pill box concept can be extended to other forms of activity monitoring that are important to one's wellbeing, where activity not sensed during a time window could be a cause for concern. In place of the pill box, a motion detector is set up to monitor movements that are essential to one's health condition. This application could apply to behavior modification using the phone call to remind someone to adhere to an important routine and to involve others to remind them when they forget. Similar to the pill box reminder, a switch mechanism to answer the call or to cause the cancellation of a reminder call triggered by a motion sensor helps reinforce the behavior without imposing unnecessary hardship on the subscriber.

DESCRIPTION OF THE DRAWINGS

In the accompanying drawings which form a part of the specifications and are to be read in conjunction therewith and in which like reference numerals are used to indicate like parts in the various views:

FIG. 11*a* Checkback.lst—an example of the call-control file;

FIG. 11*b* Checkbacklog.log—an example of the job ID log file;

FIG. 11*c* Lastcall_3017.log—an example of the call status log file;

FIG. 11*d* Checkback.log—an example of the master log file.

DETAILED SPECIFICATIONS

Static Description of the Invention

Figure 9:
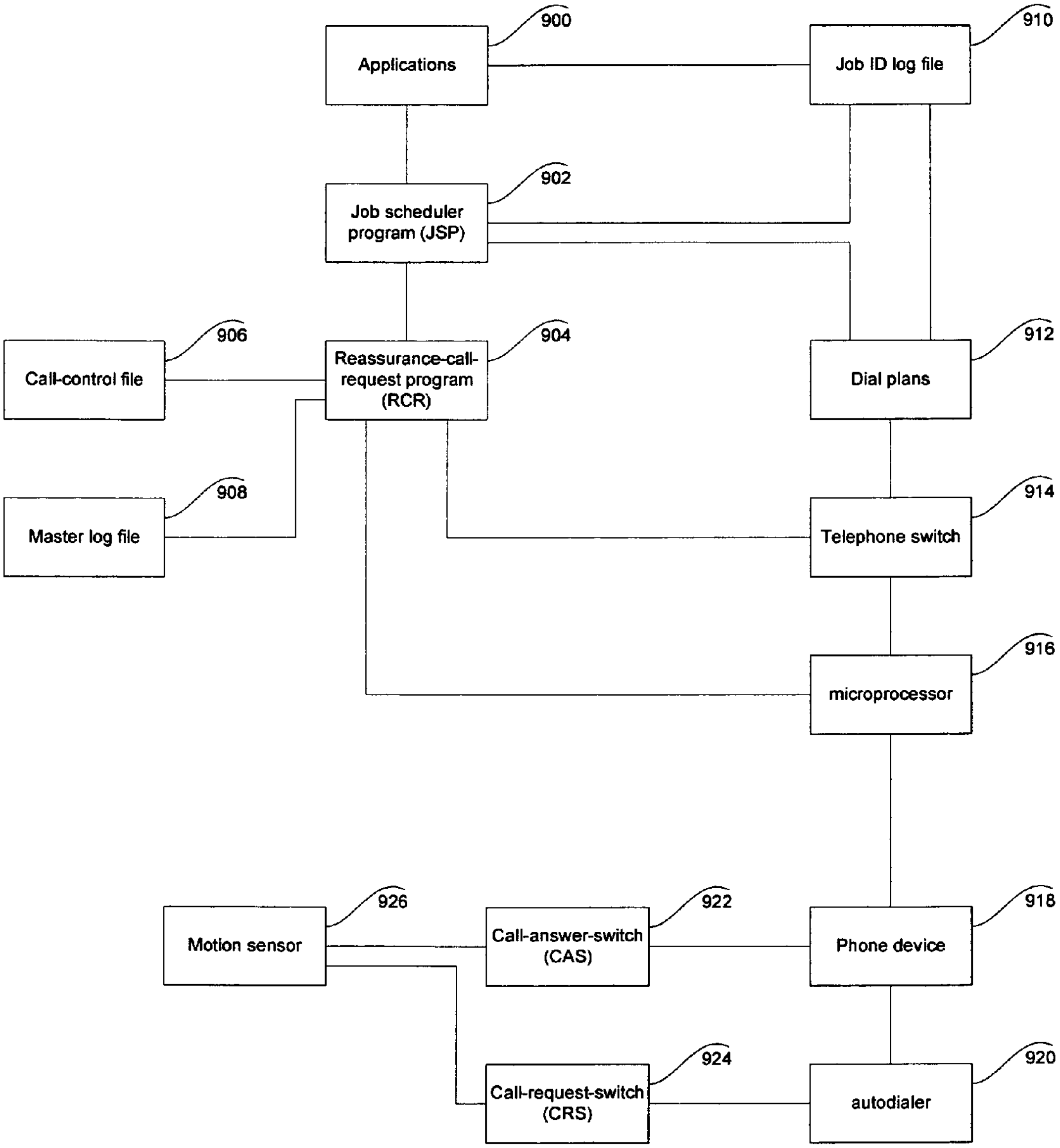
FIG. 9 is a static structure of the reassurance-call-request program (RCR) and its relationship with other functional components used for the telephone reassurance application and other monitoring and reminder functions.

Referring to FIG. 9, the reassurance-call-request program [904] is scheduled to run on some computer processor (microprocessor [916]) using one or more job scheduler program [902]. When executed, it directs the telephone switch [914] to issue telephone calls from the microprocessor [916]. Based on the result of the calls, it processes the call-control file [906] and communicates to some predetermined device according to the information in the file [906]. All call results are saved in the master log file [908]. [900] are applications using the job scheduler to schedule the reassurance-call-request program to run at some predetermined time. In doing so, it saves the subscriber's caller ID with the output from the job scheduler program [902] into the job ID log file [910]. This file is to be used later by the applications [900] and the dial plans [912] to extract the jobs to be aborted when needed. The dial plans [912] are groups of instructions referred to by the telephone switch [914] to interact with calls to and from the phone devices [918]. Some phone devices allow an autodialer [920] to automatically perform the dialing function for them. The CRS [924] is used to activate the autodialer [920]. It reacts to the signal from a motion sensor [926] or the movement of an object such as a pillbox. In another embodiment, the motion sensor or the movement of the object can cause the CAS [922] to operate, to signal the answering of a call made to the phone device.

The telephone switch [914] processes telephone calls according to its dial plans [912]. Dial plans are instructions grouped by its context and extension, and are executed in order of priority. The reassurance-call-request program [904] refers to them by their context and extension when it issues commands to the telephone switch [914].

Figure 10A:
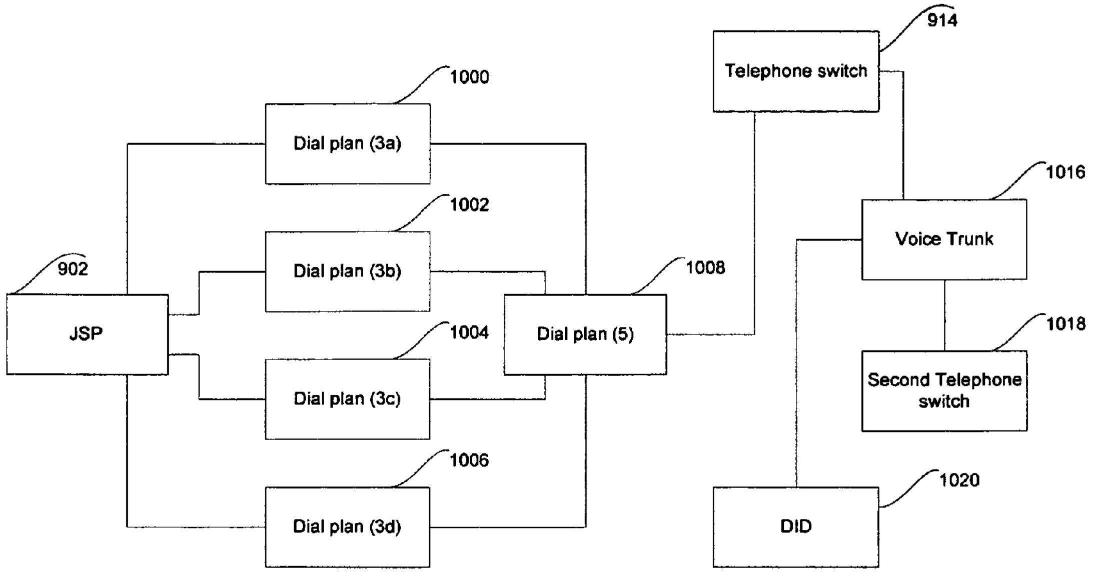
FIG. 10*a* is a static structure showing specific dial plans for processing incoming SRN calls.

Referring to FIG. 10*a*, dial plan (3*a*) [1000] is used for SRN called from a phone device registered to the telephone switch [914] to schedule a reassurance call and prompt the subscriber to provide a time-code. Dial plan (3*b*) [1002] performs the same function as [1000], but instead of asking the subscriber to enter a time-code, uses a predetermined time-code, one for each SRN. Dial plan (3*c*) [1004] is for SRN called from a phone device registered to a second telephone switch [1018]. The call is routed to the telephone switch [914] via a voice trunk [1016] (transmission facility) for transmission between telephone switches. A Direct Inward Dialing number (DID) [1020] is a telephone number from a public telephone company, when registered as a SRN, will allow a phone device on the public network to schedule a reassurance call. Dial plan (3*d*) [1008] performs the same function as [1004], but instead of asking the subscriber for a time-code, uses a predetermined time-code, one for each SRN. Dial plan (5) [1008] is a routine shared by other dial plans [1000-1006] to obtain the lead-time from a time-code for scheduling a reassurance call.

Figure 10B:
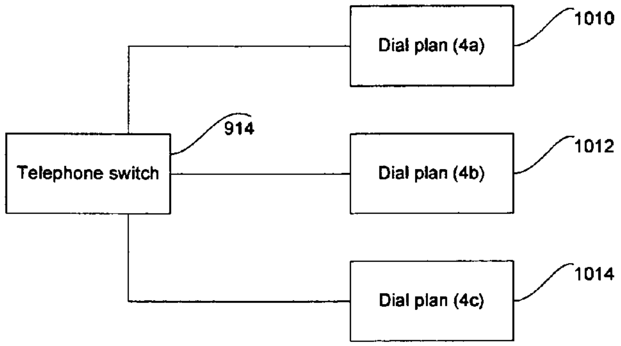
FIG. 10*b* is a static structure showing specific dial plans for processing out-going calls.

Referring to FIG. 10*b*, dial plan (4*a*) [1010] delivers a message to the subscriber when the call is answered. Dial plans (4*b*), (4*c*) [1012-1014] deliver a message to notify the recipient if the subscriber is not responding to the call.

Figure 9A:
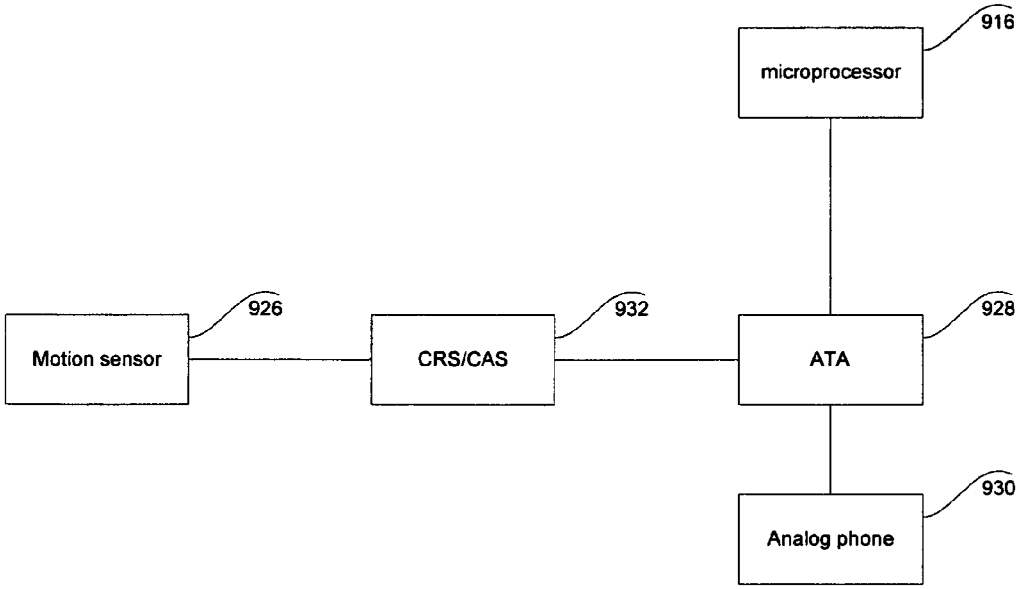
FIG. 9*a* is a static structure showing the use of an analog telephone adapter (ATA) to provide analog phone connection and autodialer function for a CRS/CAS switch.

An analog phone adapter (ATA) is a microprocessor-based phone device whereby an analog telephone can communicate to a telephone switch over an Internet connection. Referring to FIG. 9*a*, the ATA [928] is connected to the microprocessor [916]. It provides an analog phone interface to the analog phone [930] and the CRS/CAS [932]. [932] is controlled by the motion sensor [926]. Motion detected by the motion sensor [926] sends a signal to the CRS/CAS [932] to operate on the switch, bridging the tip and ring terminal of the analog phone connection at the ATA [928].

Figure 9B:
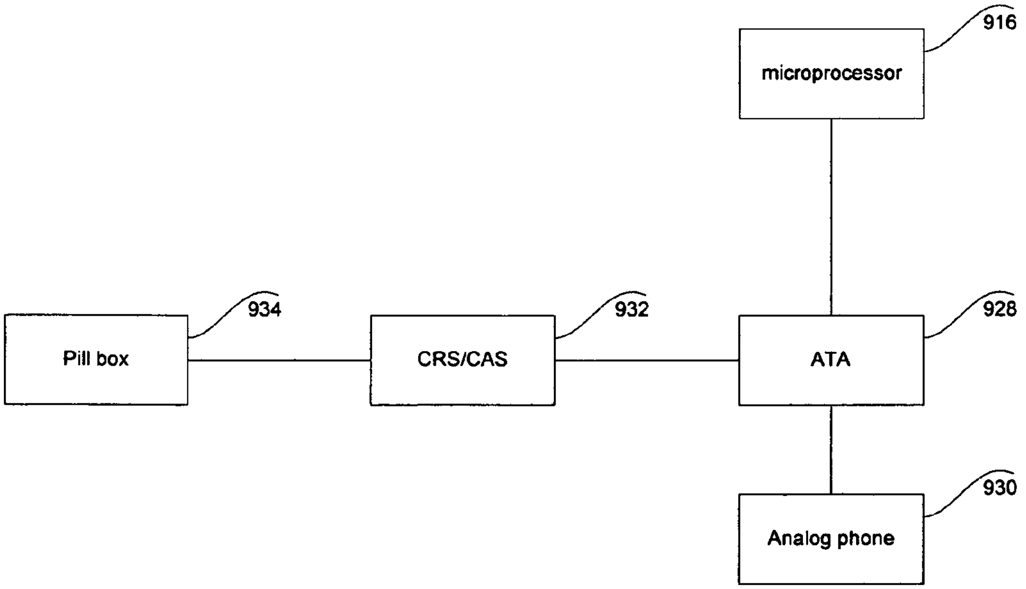
FIG. 9*b* is a static structure showing a pill box controlling a CRS/CAS switch in place of the motion sensor in FIG. 9*a;*

Referring to FIG. 9*b*, the pill box [934] takes the place of the motion sensor [926] in FIG. 9*a*. Opening the pill box [934] operates on the CRS/CAS [932], bridging the tip and ring terminal of the analog phone connection at the ATA [928].

[932] is functioning as a CAS when a call to the ATA [928] is in progress. Otherwise, it is functioning as a CRS, using the autodialer function in the ATA [928] to make calls to the processor.

OPERATION OF THE INVENTION

The RCR directs the telephone switch to use one of its dial plans to call a subscriber phone device. If the call is answered as indicated in the call status from the telephone switch, the program will not call anyone. Otherwise, the program will process the call-control file to communicate the call result to the predetermined device.

A call is considered not answered when the telephone switch returns an error status or a timeout condition when the call is not answered after some predetermined time. In this embodiment, the predetermined time is set at about 25 seconds.

When a call is answered by the subscriber, the telephone switch is directed to use one of its dial plans to play an introduction to the subscriber, then prompt the subscriber to end the call or to use the dial pad to request the call to repeat (SNOOZE).

The program can also call the subscriber a predetermined number of times (Auto-SNOOZE). When none of the calls is answered, the program will call devices identified in the call-control file and play a message to notify the recipient of the call result and/or send email(s) to notify the recipient(s) of the result.

The following describes the details of the RCR implementation and how it is used in one embodiment.

RCR Implementation

RCR consists of 1) the checkback program, written in Linux Shell script which is a programming language part of the Linux computer-operating system (Linux), and 2) the checkback.exp program, another script written in "Expect", a programming language for automating interactive program. For the checkback program to interact with a telephone switch to make calls and receive statuses of the calls, an application program interface (API) is used. In this implementation, we choose the Asterisk PBX (PBX) as the telephone switch and the associated AMI module, an API, to gain access to the PBX function. The checkback program uses the checkback.exp program to initiate calls and to execute instructions in the Asterisk dial plans. The program codes (in boxes) are included in the description of the program steps.

"cron" and "at" from Linux are job scheduler programs used in this implementation. "cron" is used to schedule the checkback program to be executed periodically, while the "at" command further delays the execution to provide lead-time before the execution of the program. Cancelling a scheduled reassurance call is equivalent to aborting the job corresponding to a scheduled execution of the checkback program. Jobs scheduled by the "at" command can be retrieved in the Job ID log file using a caller ID. They can be aborted later using the Linux "atrm" command.

When using a dial plan to schedule the execution of the checkback program, one of the allowable subscriber responses (the number 9 or "09") represents a cancel code, according to the time-code definition. When this code is selected, instead of scheduling another execution of the checkback program, the dial plan uses the "atrm" command to abort all the pending jobs associated with the subscriber's caller ID in the job ID log file.

In fact, the subscriber can choose any other time-code for the reassurance call to occur sooner. The dial plan will then abort all pending jobs for this subscriber first, before scheduling the checkback program to run at some future time. By doing so, the next reassurance call also serves to confirm that there are no more reassurance calls pending.

Storage used by the programs consists of text files. As such, accessing and processing of the files are performed by popular text manipulating utilities (e.g. "sed", "grep", "awk") from the Linux system. Following are the files used by the checkback programs and the checkback.exp program.

Call-Control File

Referring to FIG. 11*a*, checkback.lst is a call-control file. Each line is a rule associating the subscriber channel name in Field1 [1100] with a second channel name in Field3 [1104]. When present, [1104] represent the channel (associated-channel) to call when a reassurance call to the subscriber channel is not answered. The fields are separated by a space or a tab character. In Field5 [1108], the presence of an email address directs the checkback program to send a notification email to the recipients associated with this subscriber channel.

For example, in line [1110], the subscriber channel 3017 is related to an associated-channel 3000. In line [1112], the subscriber channel 18055514880@careinger refers to the number 8055514880 on the public network and the voice trunk "careringer" is used to call this subscriber. In line [1114], the associated-channel is 18055514880@careinger. In line [1116], the subscriber channel is 8310330@ovislink on another telephone switch using the voice trunk "ovislink" for transmission between the telephone switches. In line [1124], an email notification is sent to myemail@gmail.com when the call to the subscriber 18055514880@careringer is not answered.

To support Auto-SNOOZE, a reassurance call is to repeat one or more times so to allow the subscriber to respond to any one of the calls. The system will call the associated-channel only when none of the calls are attended to. This implementation uses the name "repeat1" as the associated-channel name to mean a repeat call to the subscriber is required. One such line represents a single repeat call requirement. So to repeat a reassurance call up to 3 times, 3 such lines will be added to the call-control file. Line [1118] defines Auto-SNOOZE for subscriber 3017. All reassurance calls to 3017 is to repeat once if the first call is not answered. Lines [1120] and [1122] define Auto-SNOOZE for the subscriber 3000. A call to the subscriber will be repeated up to 2 times if any of the calls is not answered.

Field2 [1102] and Field4 [1106] are reserved for future use.

Job ID Log File

Callbacklog.log is a job ID log file. It stores the subscriber's caller ID with the job ID received from the output of an "at" command used for the checkback program. Any pending jobs identified by the job ID can be extracted and the job aborted using the "atrm" command. Thus a scheduled call associated with the job is cancelled. Referring to FIG. 11*b*, Field1 [1126] is the caller ID, Field2 [1128] is the output from an "at' command. Line [1130] shows that job 1525 is associated with the caller ID 8055514880. Line [1132] shows that job 1526 is associated with the caller ID 3017.

Master Log File

Checkbackcall.log is the master log file to store the history of all results from the calls initiated from the checkback program. Referring to FIG. 11*d*, line 1 shows that a call to subscriber 3017 was not answered. Line 2 shows that a call to the associated-channel 3000 was answered.

Temporary Files

Lastcall_$caller.log (where $caller is a subscribers's caller ID) is a call status log file reserved for each subscriber. It stores the status lines returned from the checkback.exp program during the course of execution of the checkback program. The checkback program examines the status lines to determine the status of the last call to the subscriber and action accordingly. The lastcall_$caller.log file is a temporary file, and a fresh copy of the file is created at each invocation of the checkback program. Referring to the file Lastcall_3017.log in FIG. 11*c*, the lines capture the status of each call step to subscriber 3017 and to the associated-channel 3000.

$caller.txt (where $caller is a subscriber's caller ID) is another temporary file used for the formatting of the text in an email body.

Checkback Program

Figure 1:
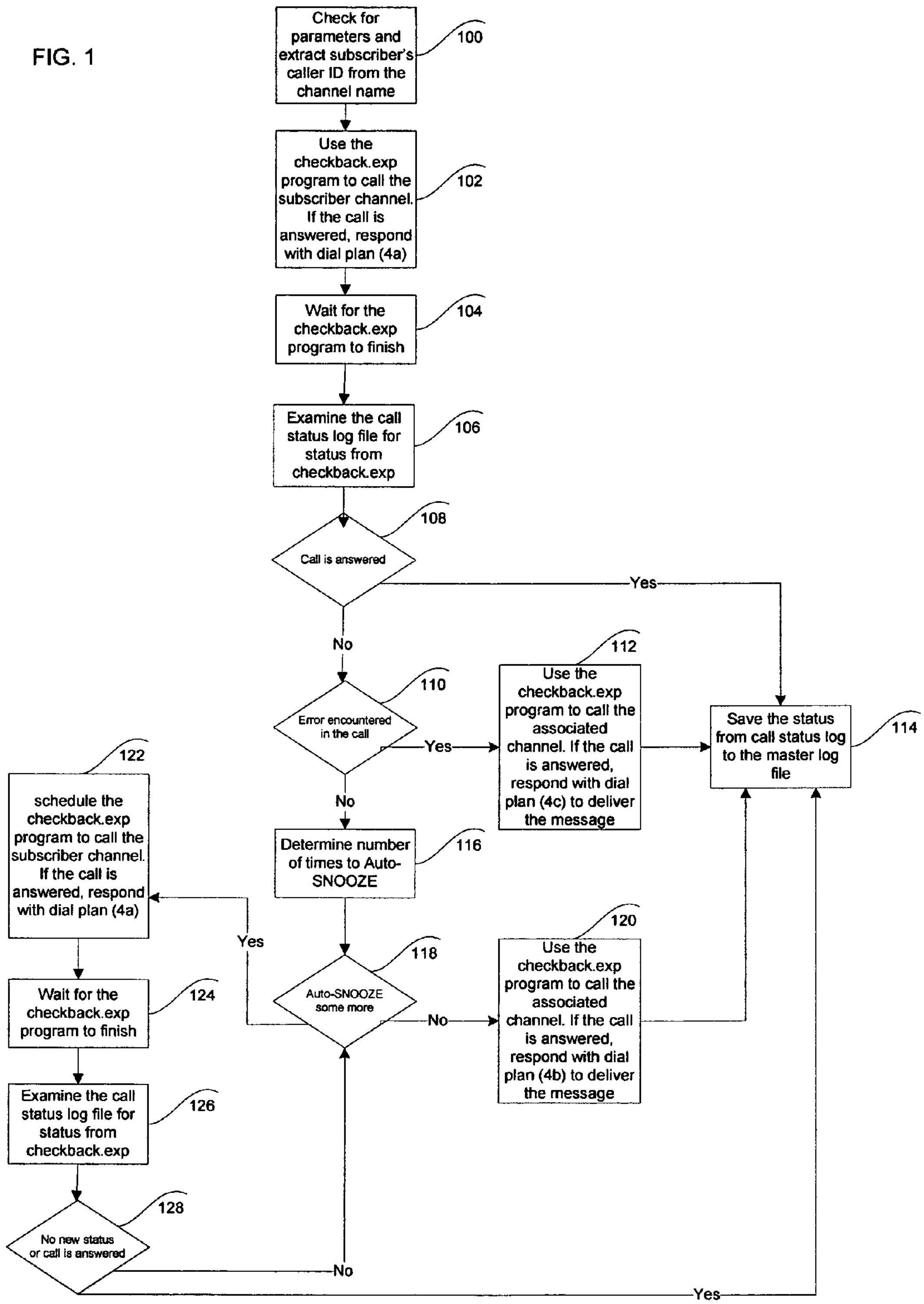
FIG. 1 is a flow chart of the checkback program.

Referring to FIG. 1, [100] check for the parameters and extract the subscriber's caller ID from the subscriber channel name. Later in the program, the caller ID will be used in notification messages. [102] use the checkback.exp program to call the subscriber channel. If the call is answered, a dial plan (see dial plan (4*a*) in FIG. 4) is used to deliver an introduction message and ask the subscriber if the call is to repeat (SNOOZE). [104] wait for the checkback.exp program to finish. [106] examine the call status log file for this subscriber for status from the checkback.exp program. [108] check if the call is answered. If so, [114] will save the status from the call status log file to the master log file and end the program. Otherwise, [110] check if there is an error encountered in the call to this subscriber. If so, [112] use the checkback.exp program to call the associated-channel according to the call-control file entries. If the call is answered, a dial plan (see dial plan (4*c*) in FIG. 4) is used to deliver a message indicating that an error is encountered in the call to the subscriber identified by subscriber's caller ID. Otherwise, [116] examine the call-control file to determine the number of times to repeat the call (Auto-SNOOZE). [118] check if more Auto-SNOOZE is required. If so, [122] schedule the checkback.exp program to call the subscriber channel at some future time, determined by the lead-time parameter. If the call is answered, a dial plan (see dial plan (4*a*) in FIG. 4) is used to deliver an introduction message and ask the subscriber if the call is to repeat (SNOOZE). [124] wait for the checkback.exp program to finish, taking into consideration the lead-time to wait. [126] examine the call status log file for this subscriber for status from the checkback.exp program. [128] check if the call is answered by the subscriber, or there is no new status returned from the checkback.exp program, meaning the job has been aborted. In either case, [114] save the status from the call status log file to the master log file for good. Otherwise, the program continues at [118] until no more Auto-SNOOZE is required. [120] then use the checkback.exp program to call the associated channel according to the call-control file entries. If the call is answered, a dial plan (see dial plan (4*b*) in FIG. 4) is used to deliver a message indicating that the call to the subscriber is not answered.

Following is the program code:

```
#!/bin/bash
# checkback files in /var/lib/asterisk/scripts
dir="/var/lib/asterisk/scripts"
tmp=$dir/tmp
log=$dir/log
# extract caller ID from channel name $2: remove leading 1, remove @trunk if any (caller ID format)
caller='echo $2|sed -e 's/^1\(.*\)@.*/\1/; s/^\(.*\)@.*/\1/''
# use checkback.exp to call the subscriber, refer to dial plan (4a)
# lead-time in $4
$dir/checkback.exp $2 $1a autodial_CheckBack 0 $4 0>$log/lastcall_$caller.log
# wait for checkback.exp program to finish
wait
# examine call status from checkback.exp
if [!-z "'grep Success $log/lastcall_$caller.log'"]; then
# call answered. Save lastcall history from this extension and exit
   cat $log/lastcall_$caller.log|grep "$1a autodial">>$log/checkbackcall.log
   exit
fi
# make sure call-control file in $3 exist. If so, gather all channel names to call
# use callerID to match, extract destination(s) to alert
if [!-s $3]; then
   exit
fi
# $3==repeat1 means checkback call repeat 1 time
rcount='awk '{if ($1==x && $3=="repeat1") print "SNOOZE"}'x=$2 $3|wc -I'
if [rcount>0]; then
# Auto-SNOOZE
for ((i=1; i<=rcount; i++)); do
# assumed abort before next call-back
   cat $log/lastcall_$caller.log|grep "$1a autodial"|awk '{print "Success", "Aborted", $3, $4, $5, $6, $7, $8, $9, $10, $11,$12, $13, $14}'>>$log/lastcall_$caller.log
   echo "$dir/checkback.exp $2 $1a autodial_CheckBack 0 $4 0>$log/lastcall_$caller.log" |at NOW+$4 MINUTE 2>&1|awk '{print x, $0}' x=$caller>>$log/checkbacklog.log
# wait for at job to complete
   sleep $4m
   sleep 30
   if [!-z "'grep Success $log/lastcall_$caller.log'"]; then
# call answered/aborted. Save lastcall history from this extension and exit
   cat $log/lastcall_$caller.log|grep "$1a autodial">>$log/
      checkbackcall.log
   exit
   fi
   done
fi
# end of Auto-SNOOZE, report call result to associated-channels
var='awk '{print x,$1,$3}' x=$2 $3|awk '{if ($1==$2 && $3 !="repeat1") print $3}''
if [-z "'grep Error $log/lastcall_$caller.log'"]; then
   for i in $var; do
# use dial plan (4b) to report not answered message
   $dir/checkback.exp $i $1a autodial_UrgentCall $caller 0
      0>>
$log/lastcall_$caller.log
   done
else
   for i in $var; do
# use dial plan (4c) to report error message
   $dir/checkback.exp $i $1a autodial_FalseAlarm $caller 0
      0>>
$log/lastcall_$caller.log
   done
fi
# save status from call status log file to master log file
cat $log/lastcall_$caller.log|grep "$1a autodial">>$log/checkbackcall.log
# process email notifications, if any
var='awk '{print x,$1,$5}' x=$2 $3|awk '{if ($1==$2) print $3}''
for i in $var; do
   case $i in
   -);;
   *@gmail.com|*@yahoo.com|*@hotmail.com)
   DATETIME='date+"%A %d %b %Y % H:% M"'
   echo "When:"$DATETIME >$tmp/$caller.txt
   echo>>$tmp/$caller.txt
   echo A request to checkback is initiated from $2.>>$tmp/$caller.txt
   echo You are identified as the person to contact if the call to $2 is not answered.>>$tmp/$caller.txt
   echo This notification is for your convenience, if it is not required please notify your system administrator>>$tmp/$caller.txt
   echo>>$tmp/$caller.txt
   echo "History:">>$tmp/$caller.txt
   echo " . . . ">>$tmp/$caller.txt
```

```
awk '{if ($2=="Answered" && $5=="autodial_CheckBack" && $3==x) print $5, $2, "at", $3, "on", $9"/"$10"/"$11, $12":"$13":"$14}' x=$2 $log/checkbackcall.log|tail -n 10>>$tmp/$caller.txt
echo " . . . ">>$tmp/$caller.txt
awk '{if (($2=="NoAnswer" && $5=="autodial_CheckBack" && $3==x)||($2 !="Error-3" && $5 !="autodial_CheckBack" && $6==y)) print $5, $2, "at", $3, "on", $9"/"$10"/"$11, $12":"$13":"$14}' x=$2 y=$caller $log/checkbackcall.log|tail -n 10>>$tmp/$caller.txt
echo>>$tmp/$caller.txt
echo " . . . errors">>$tmp/$caller.txt
awk '{if ($2=="Error-3" && (($5=="autodial_CheckBack" && $3==x)||($5 !="autodial_CheckBack" && $6==y))) print $5, $2, "at", $3, "on", $9"/"$10"/"$11, $12":"$13":"$14}' x=$2 y=$caller $log/checkbackcall.log|tail -n 10>>$tmp/$caller.txt
echo>>$tmp/$caller.txt
echo Thank you for using Linkup2.net>>$tmp/$caller.txt
sleep 5
/usr/local/sbin/sendEmail -l /var/log/sendEmail.log -s smtp-server.socal.rr.com -q -f linkup2fax@gmail.com -t $i -u "Call No Answer at" $caller -a $dir/"How does it work.pdf"-o "message-file=$tmp/$caller.txt"
;;
*);;
esac
done
```

The checkback program has 4 parameters, to be defined at the time of execution.

Parameter number 1: referenced as $1 where $1a is the extension of the dial plan to use;

Parameter number 2: referenced as $2, is the subscriber's channel name;

Parameter number 3: referenced as $3, is the name of the file (call-control file) to process when calls to the subscribers are not answered;

Parameter number 4: referenced as $4, is the lead-time for the next call. When a call is answered, the subscriber can request the system to call back again (SNOOZE) after $4 minutes. When a call is not answered, the system can repeat the call a predetermined number of times (Auto-SNOOZE) separated by $4 minutes.

In this example, the program also uses the sendEmail utility to send emails to the list of email addresses associated with the subscriber channel name in the call-control file.

Checkback.exp Program

Using the Telnet terminal program and the "Expect" interactive language to communicate with the Asterisk PBX, checkback.exp directs the PBX to make calls to phone devices using one or more dial plans customized for the call.

The checkback program uses the checkback.exp program to perform this function so it does not have to deal with the intricacies of the commands at this level. Instead, it uses only the following commands to invoke checkback.exp:

1)

```
$dir/checkback.exp $2 $1a autodial_CheckBack 0 $4 0>$log/lastcall_$caller.log
```

Where $2 is the channel name of the channel to call, $1a is the extension name and autodial_CheckBack is the context of the dial plan (4*a*) to use, $4 is the lead-time to use for SNOOZE and Auto-SNOOZE.

2)

```
echo "$dir/checkback.exp $2 $1a autodial_CheckBack 0 $4 0>$log/lastcall_$caller.log"|at NOW+$4 MINUTE 2>&1|awk '{print x, $0}' x=$caller>>$log/checkbacklog.log
```

This command delays the execution of the checkback.exp program using the lead-time value in $4.

3)

```
$dir/checkback.exp $i $1a autodial_UrgentCall $caller 0 0>>$log/lastcall_$caller.log
```

Where $i is a channel name from a list of channel to call. $1a is the extension name and autodial_UrgentCall is the context of the dial plan (4*b*) to use, $caller is the caller ID to use for the message from the dial plan.

4)

```
$dir/checkback.exp $i $1a autodial_FalseAlarm $caller 0 0>>$log/lastcall_$caller.log
```

Where $i is a channel name from a list of channel to call. $1a is the extension name and autodial_FalseAlarm is the context of the dial plan (4*c*) to use, $caller is the caller ID to use for the message from the dial plan.

In response, checkback.exp processes the parameters and sends back the status of the call to the checkback program.

Figure 2:
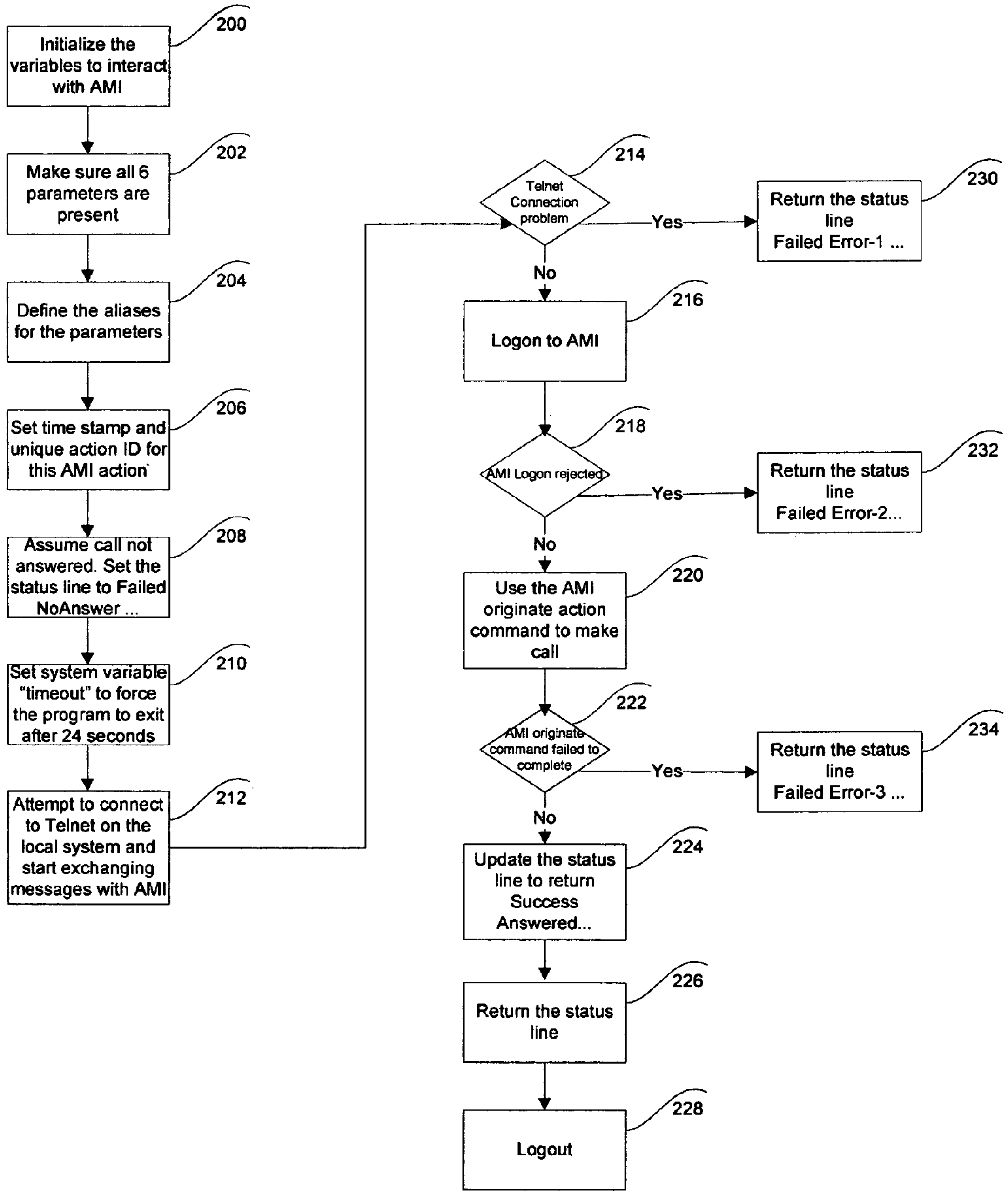
FIG. 2 is a flow chart of the checkback.exp program.

Referring to FIG. 2, [200] initialize the variables to communicate with Telnet (an interactive terminal program) and to interact with AMI (the Asterisk application interface module.)

Following is the program code:

```
#!/usr/bin/expect
# Usage: ./vmcount.exp 1234@default
set username "admin"
set secret "secret5"
set host "127.0.0.1"
set port "5038"
```

[202] check the number of parameters for checkback.exp. If it has less than the number of parameter expected (6), the program sends an error message to the checkback program and exits.

Following is the program code:

```
set parm [llength $argv]
if {[llength $argv] !=6} {
send_user "Error $parm: You must specify from/to extension . . . !\n"
exit 1
}
```

For clarity, [204] set the value for the following variables to the parameters provided to the program at the time of execution.

"extension1" is the channel name of the channel to call to.

"extension2" is the extension in the Asterisk dial plan to originate the call from. When the call is answered at extension1, the instructions in this dial plan are executed.

"context" is the part of the dial plan where extension2 applies.

"urgent" is the caller ID of the subscriber. It is passed through to the dial plan to be used by the messages.

"delay" is the lead-time to pass through to the dial plan for it to time the next call to the subscriber if the call is to be repeated.

"custom" is reserved for additional information to pass through to the dial plan.

Following is the program code:

```
set extension1 [lindex $argv 0]
set extension2 [lindex $argv 1]
set context [lindex $argv 2]
set urgent [lindex $argv 3]
set delay [lindex $argv 4]
set custom [lindex $argv 5]
```

[206] assign a time stamp and a unique action ID for this transaction. Only responses from the PBX with the same action ID are examined for statuses from this transaction.

Following is the program code:

```
set stamp [clock format [clock seconds] -format {%Y %m %d %H %M %S}]
set actionID $extension1[clock format [clock seconds] -format {%d %H %M %S}]
```

[208] set the default status line to return to the checkback program, when no result from the system is received within an expected period of time and the program times out. The status line starts with "Failed NoAnswer" to indicate the call status and the possible reason for the status.

Following is the program code:

```
set status "Failed NoAnswer $extension1 $extension2 $context $urgent $delay $custom $stamp"
```

[210] set the timeout variable to 24 seconds. When no response is received from AMI after 24 seconds, control is transferred to step [226].

Following is the program code:

```
set timeout 24
```

[212] suppress the standard output of this program, and attempt to start a Telnet session.

Following is the program code:

```
log_user 0
spawn telnet $host $port
```

[214] check the status of the connection. If the program failed to connect to Telnet, [230] sends the error message to the checkback program and exits the current program. This error message has the keywords "Failed Error-1" followed by the list of variables: $extension1 $extension2 $context $urgent $delay $custom $stamp for troubleshooting.

Following is the program code:

```
expect_before eof {
  send_user "Failed to connect. -1\n"
  send_user "Failed Error-1 $extension1 $extension2 $context $urgent $delay $custom
$stamp\n"
exit -1
}
```

Otherwise, the text string "Manager" from the system confirms the connection to Telnet. [216] attempt to login to AMI.

Following is the program code:

```
expect "Manager" {
  send_user "Connected.\n"
  send "Action: Login\nUsername: $username\nSecret: $secret\n\n"
  # Please note that telnet automatically converts line feeds
  # (\n) to CR LF (\r\n)—so you must not write \r\n here.
}
```

[218] use a regular expression to match text pattern "Response:\\s*Error" in the system response. If the pattern is found, [232] sends an error message to the checkback program and exits the current program. This error message has the keywords "Failed Error-2" followed by the list of variables: $extension1 $extension2 $context $urgent $delay $custom $stamp for troubleshooting.

Following is the program code:

```
expect {
  -re "Response:\\s*Error" {
  send_user "Login failed. -2\n"
    send_user "Failed Error-2 $extension1 $extension2
      $context $urgent $delay $custom
$stamp\n"
  exit -2
}
```

Otherwise, the pattern "Response:\\s*Success" from the system confirms successful login to the Asterisk AMI module. [220] attempt to execute the AMI originate action to call the channel and start the execution of the dial plan (determined by $extension1, $extension2) if the channel is answered. The variables $urgent, $delay and $custom are passed through to the dial plan as $var2, $var3 and $var4 respectively to be used by the dial plan.

Ringtone is set to last for 25 seconds. This value is chosen to avoid calls being answered after the program times out (24 seconds).

The action ID is included in the AMI command (originate action) for the system to respond with the same action ID for this transaction.

Following is the program code:

```
-re "Response:\\s*Success" {
  send_user "Logged in.\n"
  send "Action: originate\nchannel: sip/$extension1\nexten:
    $extension2\ncontext:
$context\npriority: 1\ncallerid: CareRinger <Linkup2.net>\ntimeout: 25000\nvariable:
var1=$extension1,var2=$urgent,var3=$delay,
var4=$custom\nActionID: $actionID\n\n"
  send_user "ActionID: $actionID\n"
  }
}
```

[222] use a regular expression to match text pattern "Response:\\s*Error" in the system response. If the pattern is found, which means the last originate action to call has failed, [234] sends the error message to the checkback program and exits the current program. This error message has the keywords "Failed Error-3" followed by the list of variables: $extension1 $extension2 $context $urgent $delay $custom $stamp for troubleshooting.

Following is the program code:

```
expect {
  -re "Response:\\s*Error" {
  send_user "Originate failed. -3\n"
    send_user "Failed Error-3 $extension1 $extension2
      $context $urgent $delay $custom
$stamp\n"
  exit -3
  }
```

Otherwise, the pattern ".*Success.*ActionID:\\s$actionID" from the system confirms the successful execution of the last AMI action, which means the originate action to call channel $extension1 is answered. Since it is not a timeout, [224] updates the status line with the keywords "Success" "Answered" followed by the variables: $extension1 $extension2 $context $urgent $delay $custom $stamp.

Following is the program code:

```
-re ".*Success.*ActionID:\\s$actionID" {
  set status "Success Answered $extension1 $extension2
$context $urgent $delay
$custom $stamp"
  }
}
```

[226] send a status line to the checkback program, using the final status in the $status variable. [228] end the current execution of the checkback.exp program with a logoff action.

Following is the program code:

```
send_user "$status\n"
# Log out—not strictly necessary, but cleaner:
  send "Action: Logoff\n\n"
  expect {
  -re "Thanks for all the fish"
  }
```

Dial Plan (3*a*)

Calls to a SRN are processed by the dial plan to schedule the execution of the checkback program. Referring to FIG.

3*a*, [300] ask the subscriber to enter a time-code. The time code is translated to a lead-time.

[302] remove all the pending jobs for this subscriber using the caller ID to retrieve the job number from the Job ID log file.

[304] schedule the checkback program to run using the "at" command and the lead-time to delay the execution, and save the job ID in the job ID log file.

[306] play a message to the subscriber to confirm the action and hang up.

Following are the dial plan instructions to process the call:

exten=>3600,1,GoSub(checkbacktime,s,1(${EXTEN}))

same=>n,System(tail -n 10 ${CheckBackLog}|awk '$1==x {print "atrm",$3}' x=${CALLERID(num)}|sh)

same=>n,System(echo ${CheckBackDir}/checkback ${EXTEN:0:4} ${CALLERID(num)} "${CheckBackDir}/checkback.lst" ${GOSUB_RETVAL}|at NOW+${GOSUB_RETVAL} MINUTE 2>&1|awk '{print ${CALLERID(num)}, $0}'>>${CheckBackLog})

same=>n,playback(${EXTEN:0:4}-CheckbackLater)

same=>n,Hangup

In this example, the SRN is 3600.

The time-code is translated by the subroutine GoSub which also prompts the subscriber for the time-code. The result lead-time is referenced as $(GOSUB_RETVAL).

The instruction same=>n,System(echo ${CheckBackDir}/checkback ${EXTEN:0:4} ${CALLERID(num)} "${CheckBackDir}/checkback.lst" ${GOSUB_RETVAL}|at NOW+${GOSUB_RETVAL} MINUTE 2>&1|awk '{print ${CALLERID(num)}, $0}'>>${CheckBackLog})

requests the system to execute the Shell command line:

echo ${CheckBackDir}/checkback ${EXTEN:0:4} ${CALLERID(num)} "${CheckBackDir}/checkback.lst" ${GOSUB_RETVAL}|at NOW+${GOSUB_RETVAL} MINUTE 2>&1|awk '{print ${CALLERID(num)}, $0}'>>${CheckBackLog} where:

${CheckBackDir} is the directory in which the checkback program is located ${EXTEN:0:4} is an extension number 3600, identifying the dial plan instructions to use for the SRN call.

${CALLERID(num)} is the phone number to call the subscriber.

"${CheckBackDir}/checkback.lst" is the name of the call-control file to process if the call is not answered.

${GOSUB_RETVAL} is the lead-time obtained from the time-code, in minute.

${CheckBackLog} is the job ID log file to save the job information output by the "at" command, along with the caller ID.

Dial Plan (3*b*)

Figure 3A:
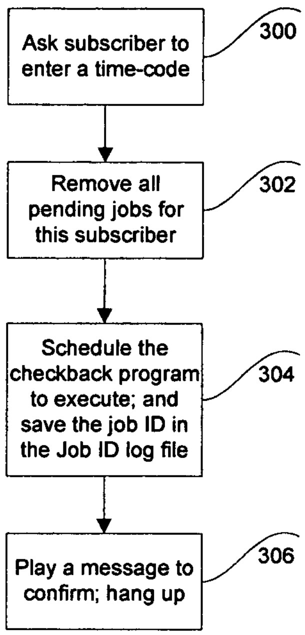
FIG. 3*a* is a flow chart of the dial plan to schedule execution of the checkback program for a phone device registered to the PBX switch, using a time-code provided by the subscriber.
Figure 3B:
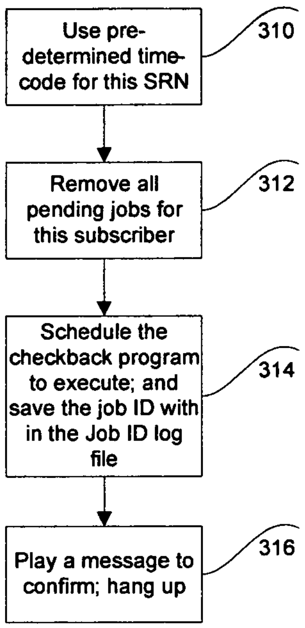
FIG. 3*b* is a flow chart of the dial plan to schedule execution of the checkback program for a phone device registered to the PBX switch, using a time-code derived from the SRN.

Calls to a SRN are processed by the dial plan to schedule the execution of the checkback program. Referring to FIG. 3*b*, [310] use a predetermined time-code derived from the SRN and translate it to the corresponding lead-time.

[312] remove all the pending jobs for this subscriber using the caller ID to retrieve the job number from the Job ID log file.

[314] schedule the checkback program to run using the "at" command and the lead-time to delay the execution, and save the job ID in the job ID log file.

[316] play a message to the subscriber to confirm the action and hang up.

Following are the dial plan instructions to process the call:

exten=>_3600XX,1,GoSub(checkbacktime,${EXTEN:4},1(${EXTEN:0:4}))

same=>n,System(tail -n 10 ${CheckBackLog}|awk '$1==x {print "atrm",$3}' x=${CALLERID(num)}|sh)

same=>n,System(echo ${CheckBackDir}/checkback ${EXTEN:0:4} ${CALLERID(num)} "${CheckBackDir}/checkback.lst" ${GOSUB_RETVAL}|at NOW+${GOSUB_RETVAL} MINUTE 2>&1|awk '{print ${CALLERID(num)}, $0}'>>${CheckBackLog})

same=>n,playback(${EXTEN:0:4}-Checkbacklater)

same=>n,Hangup

In this example, the SRN is 3600XX, where XX is any digit from 00-09. The extension _3600XX will match any 6 digit SRN beginning with 3600. The last 2 digits of the SRN is the time-code. The subscriber is not prompted for the time-code.

Dial Plan (3*c*)

Figure 3C:
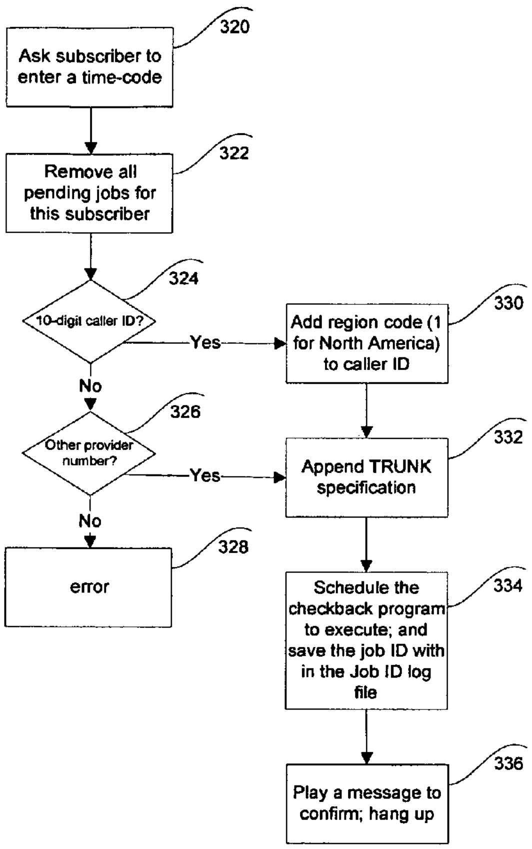
FIG. 3*c* is a flow chart of the dial plan to schedule execution of the checkback program for a phone device not registered to the PBX switch, using a time-code provided by the subscriber.

Calls to a SRN are processed by the dial plan to schedule the execution of the checkback program. Referring to FIG. 3*c*, [320] answer calls from the public telephone network. It prompts the subscriber to enter a time-code. The time-code is translated to a lead-time value.

[322] remove all the pending jobs for this subscriber using the caller ID to retrieve the job number from the Job ID log file.

[324-334] examine the caller ID and use the pattern to determine the channel name to use to call the subscriber (see details in the explanation of the dial plan instructions below).

[336] play a message to the subscriber to confirm the action and hang up.

Following are the dial plan instructions to process the call:

exten=>careringer,1,answer exten=>careringer,n,wait(1)

exten=>careringer,n,GoSub(checkbacktime,s,1(3600))

exten=>careringer,n,System(tail -n 10 ${CheckBackLog}|awk '$1==x {print "atrm",$3}' x=${CALLERID(num)}|sh); remove all scheduled checkback calls for this callerID exten=>careringer,n,Macro(CheckBack, ${GOSUB_RETVAL},3600)

exten=>careringer,n,playback(3600-CheckbackLater)

exten=>careringer,n,Hangup

[macro-CheckBack]

exten/=>s,1,Goto(${CALLERID(num)},1)

exten=>_831XXXX,1,System(echo ${CheckBackDir}/checkback ${ARG2} ${CALLERID(num)}@${MACRO_EXTEN} "${CheckBackDir}/checkback.lst" ${ARG1}|at NOW+${ARG1} MINUTE 2>&1|awk '{print ${CALLERID(num)}, $0}'>>${CheckBackLog})

exten=>_NXXXXXXXXX,1,System(echo ${CheckBackDir}/checkback ${ARG2} 1${CALLERID(num)}@${MACRO_EXTEN} "${CheckBackDir}/checkback.lst" ${ARG1}|at NOW+${ARG1} MINUTE 2>&1|awk '{print ${CALLERID(num)}, $0}'>>${CheckBackLog})

In this example, the SRN is a DID number. Control is transferred to this dial plan when this DID number is called.

The time-code is translated by the subroutine GoSub which also prompts the subscriber for the time-code. The result is referenced as $(GOSUB_RETVAL).

The dial plan defers to a macro [macro-CheckBack] to make the call. The macro examines the caller ID and uses the pattern to determine the channel name to use to call the subscriber. In this example, the voice trunk specification (i.e. @careringer) is derived from the extension name in the dial plan.

Referring to the macro, if the caller ID matches a 10-digit North America number, the call is originated from the public phone network in North America and. For call within North America, a region code "1" is added to the beginning of the channel name. Otherwise, the call is from a device registered to a second provider network (not associated with a DID) and no region code is assumed.

Dial Plan (3*d*)

Figure 3D:
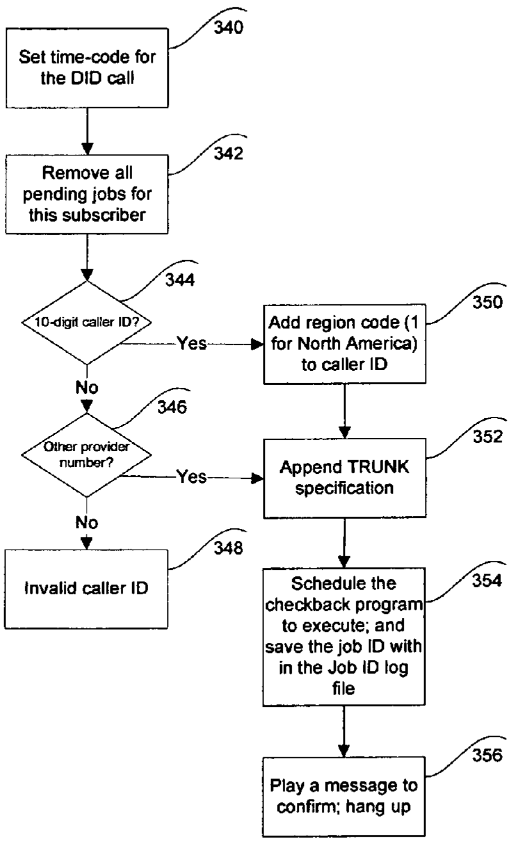
FIG. 3*d* is a flow chart of the dial plan to schedule execution of the checkback program for a phone device not registered to the PBX, using a time-code derived from the SRN.

Calls to a SRN are processed by the dial plan to schedule the execution of the checkback program. Referring to FIG. 3*d*, [340] answer calls from the public telephone network, use a predetermined time-code associated with the DID number and translate it to the corresponding lead-time.

[342] remove all the pending jobs for this subscriber using the caller ID to retrieve the job number from the Job ID log file.

[344-354] examine the caller ID and use the pattern to determine the channel name to use to call the subscriber (see details in the explanation of the dial plan instructions below).

[356] play a message to the subscriber to confirm the action and hang up.

Following are the dial plan instructions to process the call:

```
exten=>careringer,1,answer
exten=>careringer,n,wait(1)
exten=>careringer,n,GoSub(checkbacktime,“1”,1(3600))
exten=>careringer,n,System(tail -n 10 ${CheckBackLog}|awk ‘$1==x {print “atrm”,$3}’ x=${CALLERID(num)}|sh); remove all scheduled checkback calls for this callerID
exten=>careringer,n,Macro(CheckBack, ${GOSUB_RETVAL},3600)
exten=>careringer,n,playback(3600-CheckbackLater)
exten=>careringer,n,Hangup
```

In this example, the SRN is a DID number. Control is transferred to this dial plan when this DID number is called.

The time-code is set to "1" for this SRN. It is translated by the subroutine GoSub to 5 minutes lead-time. The result is referenced as $(GOSUB_RETVAL). Other SRN will have a different time-code mapped to a lead-time.

The dial plan defers to the macro [macro-CheckBack] to make the call. The macro examines the caller ID and uses the pattern to determine the channel name to use to call the subscriber. In this example, the voice trunk specification (i.e. @careringer) is derived from the extension name in the dial plan.

Referring to the macro, if the caller ID matches a 10-digit North America number, the call is originated from the public phone network in North America and a region code "1" is added to the channel name. Otherwise, the call is from a device registered to a second provider network (not associated with a DID) and no region code is assumed.

Dial Plan (5)

Dial plan (5) is a routine shared by the other dial plans to translate a time-code to a lead-time value.

Figure 5:
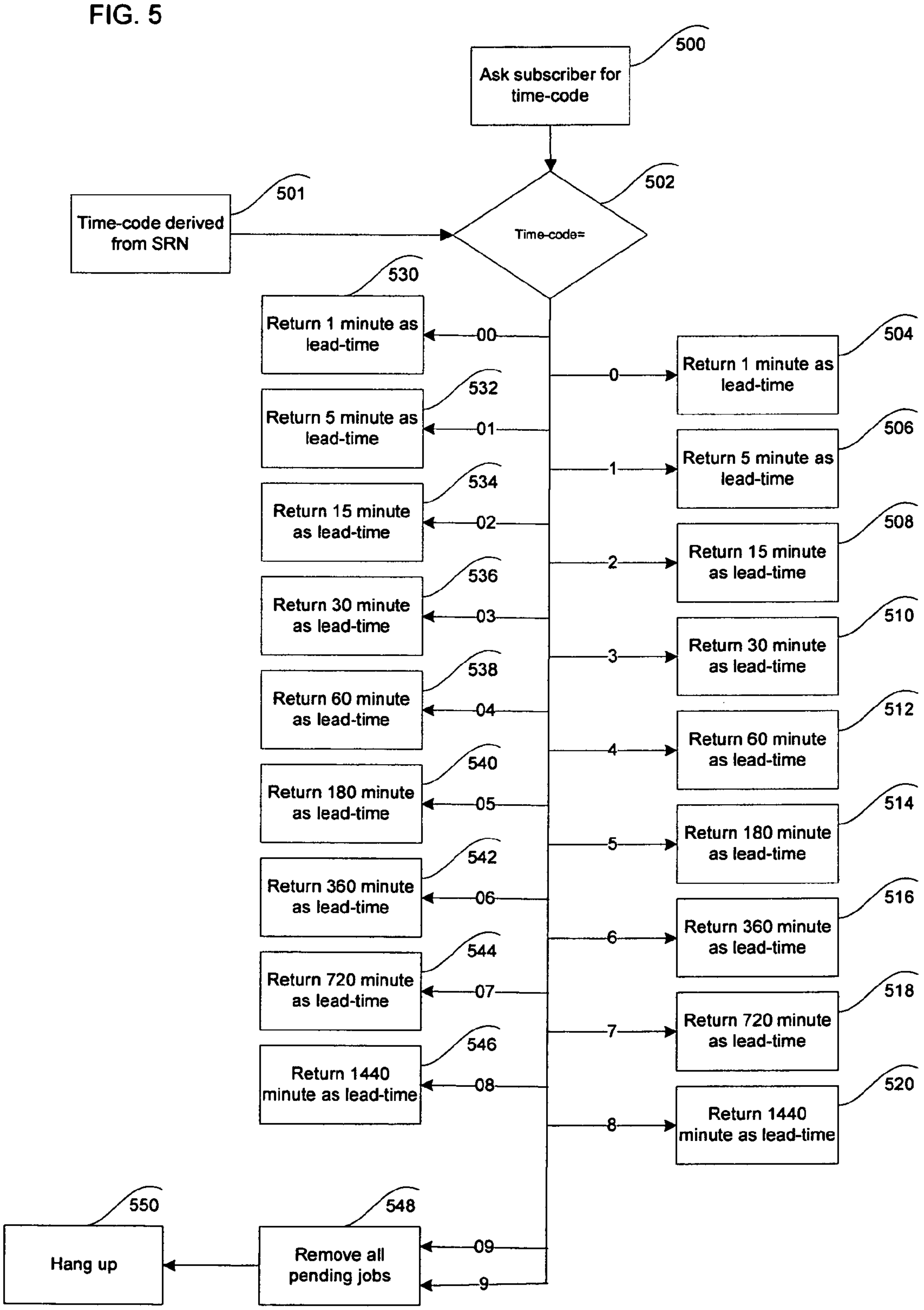
FIG. 5 is a flow chart of a dial plan routine to determine lead-time from time-code.

Referring to FIG. 5, [500] prompt the subscriber to enter a time-code.

[502-546] examine the time-code and use it as an index to the lead-time and return the corresponding lead-time value (see details in the explanation of the dial plan instructions below).

[548] remove all pending jobs found in the Job ID log file that are scheduled by this subscriber.

[501] is a second entry point to this routine so the subscriber is not prompted for the time code.

Following are the dial plan instructions:

```
; GOSUB to prompt user for time-code
; use default time if silence for 5 sec
[checkbacktime]
exten=>s,1,Verbose(3,CheckBackTime)
 same=>n,Background(${ARG1}-CheckbackSelectTime&silence/1)
 same=>n,Background(vm-press&digits/1&vm-for&digits/5&vm-minutes)
 same=>n,Background(digits/2&vm-for&digits/15&vm-minutes)
 same=>n,Background(digits/3&vm-for&digits/30&vm-minutes)
 same=>n,Background(digits/4&vm-for&digits/60&vm-minutes)
 same=>n,Background(digits/5&vm-for&digits/3&hours)
 same=>n,Background(digits/6&vm-for&digits/6&hours)
 same=>n,Background(digits/7&vm-for&digits/12&hours)
 same=>n,Background(digits/8&vm-for&digits/20&digits/4&hours)
 same=>n,Background(ascending-2tone)
 same=>n,BackgroundDetect(/var/lib/asterisk/sounds/en/silence/5,4250,20)
 same=>n,Return(${CheckBackTime})
exten=>0,1,Return(${CheckBackTime})
exten=>1,1,Return(5)
exten=>2,1,Return(15)
exten=>3,1,Return(30)
exten=>4,1,Return(60)
exten=>5,1,Return(180)
exten=>6,1,Return(360)
exten=>7,1,Return(720)
exten=>8,1,Return(1440)
exten=>9,1,System(tail -n 10{CheckBackLog}|awk ‘$1==x {print “atrm”,$3}’ x=${CALLERID(num)}|sh); remove all scheduled checkback calls for this callerID
exten=>9,2,playback(vm-marked-nonurgent&vm-goodbye)
exten=>9,3,hangup
exten=>_00,1,Return(${CheckBackTime})
exten=>_01,1,Return(5)
exten=>_02,1,Return(15)
exten=>_03,1,Return(30)
exten=>_04,1,Return(60)
exten=>_05,1,Return(180)
exten=>_06,1,Return(360)
exten=>_07,1,Return(720)
exten=>_08,1,Return(1440)
exten=>_09,1,System(tail -n 10 ${CheckBackLog}|awk ‘$1==x {print “atrm”,$3}’ x=${CALLERID(num)}|sh); remove all scheduled checkback calls for this callerID
exten=>_09,2,playback(vm-marked-nonurgent&vm-goodbye)
exten=>_09,3,hangup
exten=>i,1,playback(conf-errormenu&vm-pls-try-again&vm-goodbye)
exten=>i,2,hangup
```

In this example, a time-code specified as a single-digit or a double digit code from 0 to 9 (or 00-09) is translated to its lead-time value according to the following accelerating scale.

In this implementation, we assume many of the time values are not necessary, hence the use of an accelerating scale for the translation.

0—within 1 minute
1—5 minutes
2—15 minutes
3—30 minutes
4—60 minutes
5—180 minutes (3 hours)
6—360 minutes (6 hours)
7—720 minutes (12 hours)
8—1440 minutes (24 hours)
9—Remove the job(s) where the caller ID is associated with the job ID in the job ID file using the “atrm” command.
00—within 1 minute
01—5 minutes
02—15 minutes
03—30 minutes
04—60 minutes
05—180 minutes (3 hours)
06—360 minutes (6 hours)
07—720 minutes (12 hours)
08—1440 minutes (24 hours)
09—Remove the job(s) where the caller ID is associated with the job ID in the job ID file using the “atrm” command.

If no response is detected, the default (0) is used.

Dial Plan (4*a*)

The checkback.exp program use an AMI command (originate action) to call a subscriber channel. When the call is answered, the system transfers control to dial plan (4*a*) to interact with the subscriber.

In this example, the dial plan is invoked from the checkback.exp command:

```
$dir/checkback.exp $2 $1a autodial_CheckBack 0 $4 0>$log/lastcall_$caller.log
```

Where $2 is a channel name, $1 is 3600, $4 is the lead-time.

Figure 4:
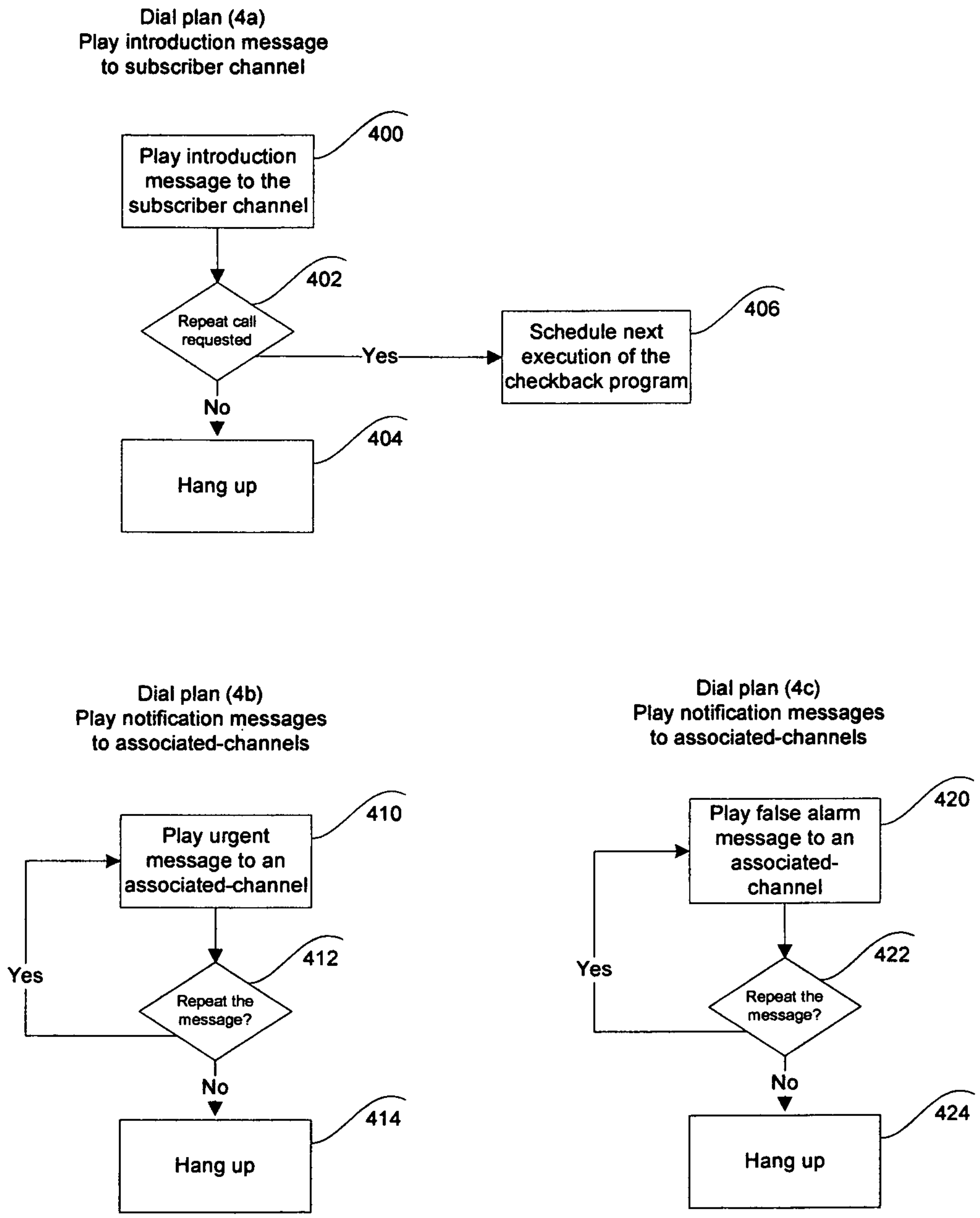
FIG. 4 shows flow charts of dial plans to play different messages to target channels.

Referring to FIG. 4, [400] play an introduction message to the subscriber. The subscriber is asked if the call is to be repeated (SNOOZE.)

[402] determine if SNOOZE is requested. If so, [406] schedule a job to execute the checkback program with the same parameters provided for the last reassurance call request.

Otherwise, [404] end the call.

Following are the dial plan instructions:

```
[autodial_CheckBack]
exten=>3600a,1,Set(X4=${EXTEN:0:4})
exten=>3600a,n,background(${X4}-CheckbackIntro); play message
exten=>3600a,n,background(${X4}-CheckbackAgain)
exten=>3600a,n,BackgroundDetect(/var/lib/asterisk/sounds/en/silence/5,4250,20)
exten=>3600a,n,playback(vm-goodbye)
exten=>3600a,n,hangup
exten=>_[1-90*#],1,System(echo ${CheckBackDir}/checkback ${X4} ${var1} “${CheckBackDir}/checkback.lst” ${var3}|at NOW+${var3} MINUTE 2>&1|awk ‘{print ${var1}, $0}’>>${CheckBackLog})
exten=>_[1-90*#],n,playback(${X4}-CheckbackLater)
exten=>_[1-90*#],n,Hangup
exten=>h,1,Hangup
```

The subscriber can enter any key to request for SNOOZE.

The extension 3600 saved in ${X4} was used to reference the dial plan for the last call, and the same channel name and lead-time value are retrieved from the system variables ${var1}, ${var3}.

Dial Plan (4*b*)

When a subscriber is not responding to the reassurance call, the checkback.exp program uses an AMI command (originate action) to call a second channel to deliver a notification message. When the call is answered, the system transfers control to dial plan (4*b*) to deliver the message to the recipient.

In this example, the dial plan is invoked from the checkback.exp command:

```
$dir/checkback.exp $i $1a autodial_UrgentCall $caller 0 0>>$log/lastcall_$caller.log
```

Where $i is a channel name, $1 is 3600, $caller is the channel name of the subscriber.

Referring to FIG. 4, [410] play an urgent message to alert the recipient, referencing the subscriber caller ID.

[412] determine if the message is to repeat. If so, [410] play the message again Otherwise, [414] end the call.

Following are the dial plan instructions:

```
[autodial_UrgentCall]
exten=>3600a,1,Noop(urgent callerID is: ${var2})
exten=>3600a,n,Set(X4=${EXTEN:0:4})
exten=>3600a,n,playback(${X4}-CheckbackMessage-From)
exten=>3600a,n,SayDigits(${var2})
exten=>3600a,n,playback(${X4}-CheckbackInitiatedFrom&silence/1)
exten=>3600a,n,background(${X4}-CheckbackRepeatMessage&silence/1)
exten=>3600a,n,BackgroundDetect(/var/lib/asterisk/sounds/en/silence/5,4250,20)
exten=>3600a,n,playback(vm-goodbye)
exten=>3600a,n, Hangup
exten=>_[1-90],1,Goto(${X4}a,1)
exten=>#,1,playback(vm-goodbye)
exten=>#,2,Hangup
exten=>h,1,Hangup
```

Caller ID is retrieved from the system variable ${var2}.

The recipient is allowed to enter any numeric key to repeat the alert message.

Dial Plan (4*c*)

When the system fails in calling the subscriber, the checkback.exp program uses an AMI command (originate action) to call a second channel to deliver a notification message. When the call is answered, the system transfers control to dial plan (4*c*) to deliver the message to the recipient.

In this example, the dial plan is invoked from the checkback.exp command:

```
$dir/checkback.exp $i $1a autodial_FalseAlarm $caller 0 0>>$log/lastcall_$caller.log
```

Where $i is a channel name, $1 is 3600, $caller is the caller ID of the subscriber.

Referring to FIG. 4, [420] play a message and reference the subscriber caller ID. [422] determine if the message is to repeat. If so, [420] play the message again Otherwise, [424] end the call.

Following are the dial plan instructions:

```
[autodial_FalseAlarm]
; Handled same as Urgent call
include=>autodial_UrgentCall
```

The dial plan instructions used are same as in dial plan (4*b*) in this example.

Self-Monitoring Call Application

Self-monitoring reassurance call is scheduled from the subscriber device, by calling a SRN and entering a time-code. The subscriber is given the option to request for the reassurance call to repeat, or cancel the next reassurance call in advance.

Figure 6:
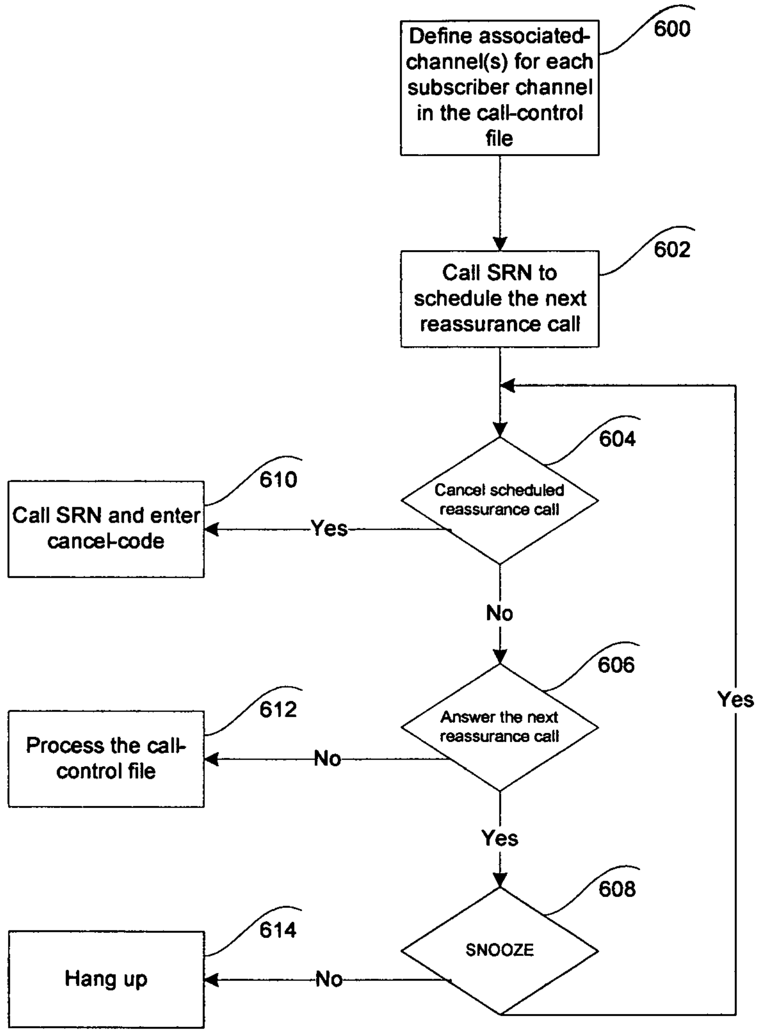
FIG. 6 is a flow chart of a process to request reassurance calls for self-monitoring purposes.

Referring to FIG. 6, [600] edit the call-control file to add the entries associating the subscriber channel with the channels to call when the reassurance call is not answered. In step [602] the subscriber calls a SRN and provides the time-code to schedule the next reassurance call to call back. [604] determine if the scheduled call is to be cancelled. If so, the subscriber will call the SRN and enter the cancel-code to cancel in step [610] (the subscriber can also choose to enter one of the other time-codes to reschedule the reassurance call here.) Otherwise, the system will proceed to call the subscriber at some future time determined by the time-code. [606] determine if the call is answered by the subscriber. If the call is not answered by the subscriber, [612] will process the call-control file. Otherwise the call is answered by the subscriber and [608] determine from the subscriber's response if the reassurance call is to be repeated (SNOOZE.) If so, control is transferred to [604], otherwise the program stops after the subscriber ends the call in [614].

Reassurance Call Application

Instead of scheduling the next reassurance call from the subscriber device as in [602], daily reassurance calls are scheduled using a time-based job scheduler program (JSP) to schedule the execution of the checkback program. Each of the following commands represents an embodiment.

1)

In the simplest form, checkback is launched once by the following command (using the Linux Shell command syntax.)

checkback 3600 16264650141@careringer checkback.lst 5

This command asks the system to direct the PBX to using the dial plan with extension number 3600 to call the subscriber number 6264650141 (subscriber caller ID) immediately once, using the voice trunk "careringer" and the call-control file checkback.lst. Lead-time to wait between repeating calls for SNOOZE or Auto-ANOOZE is set at 5 minutes apart.

2)

To delay the first execution of the program by 5 minutes, one can use the Linux "pipe" utility and the "at" command, as such.

checkback 3600 16264650141@careringer checkback.lst 5|at NOW+5 MINUTE

The "at" job scheduler creates a job ID for this command and submits it for execution 5 minutes from now.

3)

In the following command, the job ID and other information are saved with the subscriber caller ID in the job ID log file with the "awk" command. This is the format used for scheduling a reassurance call from a dial plan to allow a subscriber to cancel a scheduled reassurance call.

With the job ID in the log file, it can be retrieved and the job aborted at a later time by the subscriber.

echo checkback 3600 16264650141@careringer checkback.lst 5|at NOW+5 MINUTE 2>&1|awk '{print 6264650141, $0}'>>checkbacklog.log

4)

Another way to schedule the execution of the checkback program is to use the "cron" utility, which examines the "crontab" table for jobs to execute. By placing the checkback program in a "crontab" table, it can be executed repeatedly on a given schedule. The following entry in the "crontab" table will start the above command everyday at 9:00 pm.

00 21 * * * echo checkback 3600 16264650141@careringer checkback.lst 5|at NOW+5 MINUTE 2>&1|awk '{print 6264650141, $0}'>>checkbacklog.log The checkback program actually starts at 5 minutes after 9:00 pm because the parameter of the "at" command is NOW+5 MINUTE.

Figure 7:
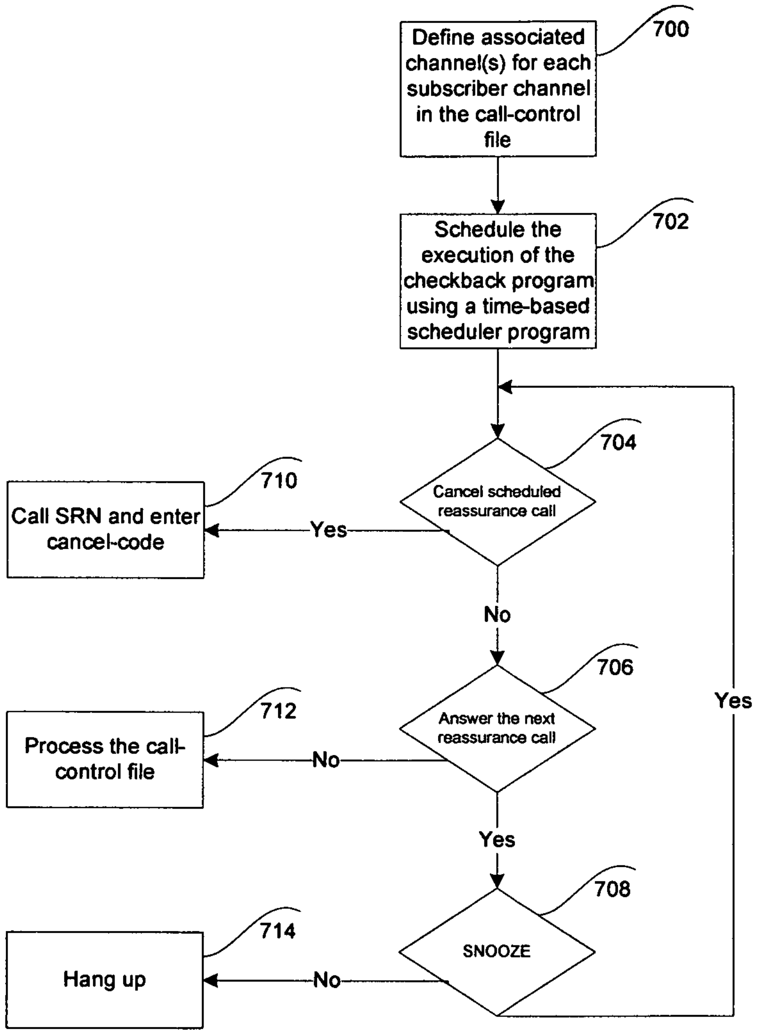
FIG. 7 is a flow chart of a process to use a time-based job scheduler program (JSP) to set up daily reassurance calls.

Referring to FIG. 7, [702] schedule the execution of the checkback program using the "cron" utility as above. This daily call arrangement allows the full option of [710] to cancel a call in advance and to trigger SNOOZE [708] to repeat the call before the next scheduled call from "cron"

5)

If cancelling the call in advance is not an option, the "at" command will not be required, as such:

00 21 * * * checkback 3600 16264650141@careringer checkback.lst 5

Pill Box Reminder Application

An ATA is used to provide the autodialer function. An ATA is registered as a phone extension on the PBX. Daily reassurance calls are scheduled to call the ATA. In response, the ATA answers the call when the pill box is opened, triggering a CAS to send an OHS to the processor. If the pill box is not opened, the call will go unanswered, resulting in the checkback program calling the associated-channels to notify the associates of the inactivity.

The following entry in "crontab" will allow the execution of the checkback program to be aborted up to 60 minutes before the call to the subscriber occurs at 10 pm (assume Auto-SNOOZE not used.)

00 21 * * * echo checkback 3600 16264650141@careringer checkback.lst 5|at NOW+60 MINUTE 2>&1|awk '{print 6264650141, $0}'>>checkbacklog.log When the pill box is opened during this time, the activity triggers a CRS to operate on the contact. In response to the contact closure, the ATA dials a predetermined SRN to abort the job. In one embodiment, the last 2 digits of the SRN is the time-code set to 09. According to the time-code translation in dial plan (5), the system uses "atrm" to abort the job associated with the ATA's caller ID.

The set up can accommodate other time requirements by varying the time of day and the lead-time used in the command.

In place of a pill box, a relay controlled by a motion sensor can be used to respond to a scheduled reminder call. Before the call, motion detected will cause the scheduled call to be cancelled. During the call, motion detected will result in answering the call and sending an OHS to the processor to end further action.

Inactivity Monitoring

Figure 8A:
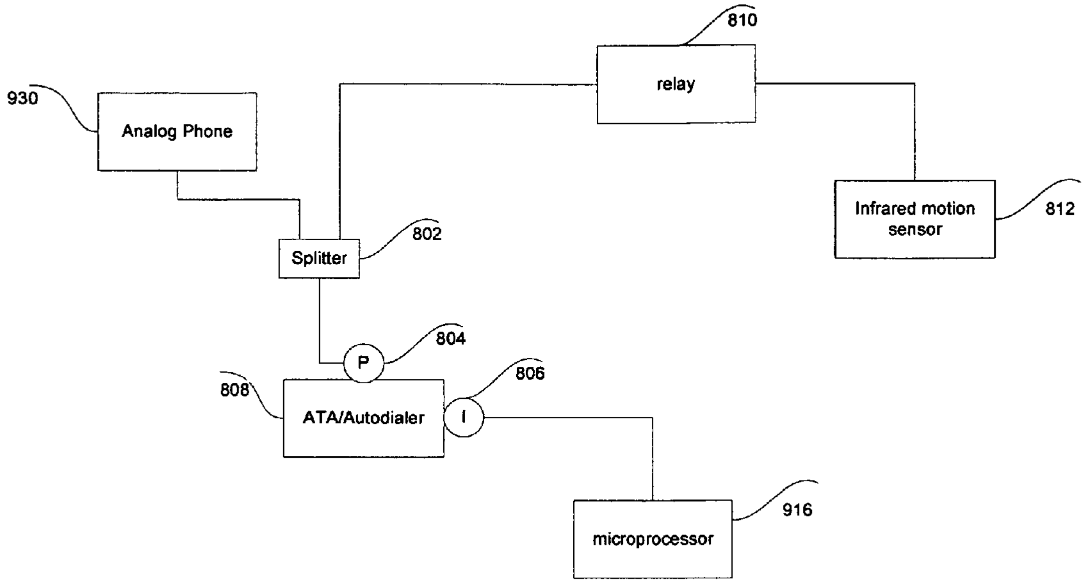
FIG. 8*a* is a functional block diagram of a configuration where a single infrared motion sensor is used with a relay to trigger calls from an ATA.

Inactivity monitoring applies to the reminder service in general. Using a remote switch, one or more motion sensors can be deployed to monitor inactivity whereby the absence of any activity within a time period will result in an alert sent to the subscriber and the subscriber's associates. Referring to FIG. 8*a*, motion triggers an infrared motion sensor to send a current to the wired relay [810]. The current applied to the relay (served as a CRS) operates on the contacts at [810], bridging the ring and tip terminal at the phone port [804] of the ATA [808]. From the Internet port I [806], it dials a predetermined SRN to abort any jobs associated with the subscriber's caller ID of the ATA. If there are any pending jobs in the job ID log file at the time, these jobs will be aborted and the scheduled calls associated with the job ID's are cancelled.

When there is no activity detected by the infrared motion detector, a scheduled checkback program will be executed at some future time to call the ATA. The splitter [802] transmits the call signal to the analog phone [930] and the analog phone will generate a ring tone to signal inactivity. Motion detected while the call is in progress will operate on the relay (served as a CAS), bridging the ring and tip terminal at the phone port [804] and sending an OHS to the microprocessor [916]. Without the OHS, the call-control file will be processed and the predetermined devices will be contacted.

Answering the call to the analog phone [930] will also send an OHS to the microprocessor. Thus, it can be used as a manual override for test purposes.

Inactivity Monitoring2

Figure 8B:
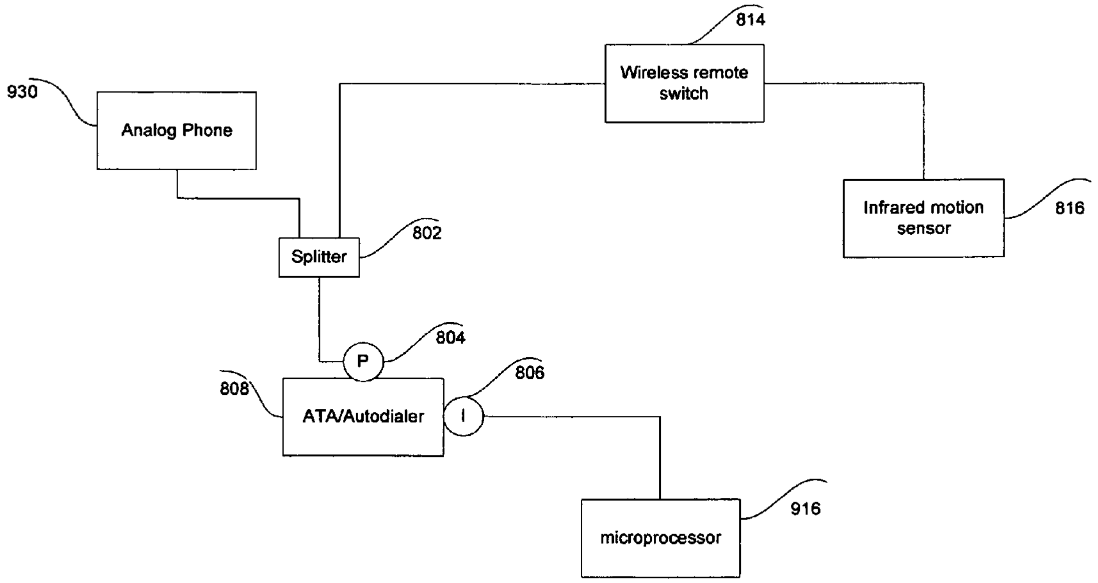
FIG. 8*b* is a functional block diagram of a configuration where multiple infrared motion sensors are used with a wireless remote switch to trigger calls from an ATA.

Referring to FIG. 8*b*, a wireless remote switch [814] replaces the relay [810] in FIG. 8*a*. Motion sensed by any of the infrared motion sensors [816] will cause it to transmit a fixed code to the wireless remote switch [814] to close the contacts, bridging the ring and tip terminal at the phone port P [804].

Activity Monitoring

Activity monitoring applies to security systems and surveillance functions in general. One or more motion detectors can be deployed to monitor activity whereby the presence of activity will be reported to the subscriber and the subscriber's associates.

Referring to FIG. 8*b*, the ATA [928] is programmed to call a SRN to schedule the execution of the checkback program. Activity detected by any one of the motion sensors [812] triggers a reassurance call from the checkback program at some predetermined future time. One can use the phone [930] to answer the call and send an OHS to the microprocessor [916] to disable further action. Otherwise, the call is not answered and the checkback program will proceed to process the call-control file and communicate to other devices to notify the recipients of the unexpected activity.

For a security system application, a delay time (that is greater than the lead-time selected for the checkback program) is set in the motion detector to unarm the motion detector for a period of time so that subsequent motions will not abort the job associated with the last trigger.

CONCLUSION, RAMIFICATION AND SCOPE OF INVENTION

Thus, the reader can see how a reassurance-call-request program (RCR), when used in conjunction with one or more job scheduler program (JSP) and a telephone switch, is capable of providing telephone reassurance for phone devices registered to disparate phone networks. The term phone device applies to analog telephone as well as to any device that supports telephone functions, including analog phone, digital phone, cell phone and smart phone. When a subscriber is using a phone device to schedule the RCR, with the intention of alerting someone to come to their attention, the call back from the program can serve as a confirmation indicating the alert is about to occur. A remote button controlling a call-request-switch (CRS) extends the subscriber's reach for the phone.

Many devices which use a button to call for attention associate the press of the button with a light emitting element or a ringer to provide feedback to the user. For telephone reassurance, I believe the use of a custom ring tone or a pre-recorded message from a phone device as feedback is an improvement over other methods.

Provision to trigger calls to subscribers based on motion and specific movements of an object such as opening of a pill box or a container further expands the application. Ramifications include activity or inactivity monitoring functions and reminders involving the use of a variety of sensors and switches. While the detailed descriptions contain many specifications, including program codes, these should not be construed as limitations on the scope of the invention, but rather as an exemplification of one embodiment thereof. Many other variations are possible. For example, the variable names, the values used for variables in the program codes and command lines represent only one of many choices. The implementation is based on Linux and Asterisk PBX as the telephone switch, and microprocessors supporting these program products. Yet the methods are not tied to any one of them since the concept of job scheduler and dial plans used by a telephone switch to process calls have existed for some time. The use of Shell scripts can be replaced with other programming languages such as the C language to make the program more portable. Using a different telephone switch other than the Asterisk PBX simply means rewriting the dial plans in its native language and adopting the application interface specific to the chosen telephone switch. The checkback.exp program hides the details specific to the Asterisk PBX, thus making the porting of the codes even easier. It should be obvious that the processing of the call-control file could result in the execution of a program which can be used as a means to communicate to other devices, instead of just communicating to some recipient using a phone device or email. Accordingly, the scope of this invention should be determined not by the embodiment(s) illustrated, but by the appended claims and their legal equivalent.

I claim:

1. A communication apparatus to facilitate telephone reassurance, activity monitoring and reminder, comprising:

a first memory device, for storing a program having codes, when executed by a microprocessor, to automate calls to a plurality of registered devices;

a telephone switch for receiving a first service-request-number (SRN) call from at least one of said plurality of registered devices subscribed for said telephone reassurance with said telephone switch, causing said program to initiate one or more calls directed back to said at least one registered device at a future time in response to said first SRN call, and communicating a status of said call to one or more predetermined registered devices when any one said call is not answered;

a second memory device, for storing a scheduler module having codes, when executed by said microprocessor, to cause said calls to be changed from said scheduler module if said at least one registered device initiates a second SRN call with a provision of a time-code of a plurality of time-codes corresponding to a plurality of dial plans to said telephone switch prior to said future time.

2. Apparatus set forth in claim 1, wherein said program repeats said one or more calls to said at least one registered device when a special command (SNOOZE) is entered in response to said call.

3. Apparatus set forth in claim 1, wherein an accelerating scale is used by said plurality of dial plans to compute said future time from a time-code of said plurality of time-codes.

4. Apparatus set forth in claim 1, wherein said first SRN call with a provision of time-code of said plurality of time-codes from said at least one registered device is initiated by a call-request-switch (CRS) activating an autodialer associated with said at least one registered device having a call-answer-switch (CAS) to answer one or more said calls resulting from said first SRN call.

5. Apparatus set forth in claim 1, wherein said first SRN call with a provision of time-code of said plurality of time-codes from said at least one registered device is initiated by a CRS activating an autodialer associated with said at least one registered device using said CRS activating said autodialer to initiate a second SRN call prior to said future time to change said call resulting from said first SRN call.

6. Apparatus set forth in claim 5, wherein said CRS activates an autodialer in response to movement of a subject.

7. Apparatus set forth in claim 6, wherein a delay timer is set to disable said CRS from initiating said second SRN call prior to said future time.

8. Apparatus set forth in claim 1, further including a third memory device, for storing a scheduler module having codes, when executed by said microprocessor, to initiate one or more said first SRN calls with said provision of time-code of said plurality of time-codes from said at least one registered device one or more times according to a schedule.

9. Apparatus set forth in claim 8, wherein said call is answered by said at least one registered device with a CAS.

10. Apparatus set forth in claim 8, wherein a CRS activates an autodialer associated with said at least one registered device prior to said future time to change said call.

11. Apparatus set forth in claim 10, wherein said CRS operates with a motion detector responding to movement of a subject.

12. Apparatus set forth in claim 11, wherein a delay timer is set to disable said CRS from initiating said second SRN call prior to said future time.

13. Apparatus set forth in claim 1, further including a third memory device, storing one auto-SNOOZE instruction for each auto-SNOOZE call of said call to be initiated by said program responding to said first SRN call.

14. Apparatus set forth in claim 13, wherein said program further having codes, when executed on said microprocessor, selects one or more email addresses from said third memory device in place of at least one of said plurality of registered devices to communicate said status.

15. Apparatus set forth in claim 1, wherein said predetermined registered device triggers an alarm in a security system connecting to said predetermined registered device to report said status.

16. Apparatus set forth in claim 1, wherein the Internet provides connection for said telephone switch with at least one of said plurality of registered devices having an analog telephone adaptor (ATA).

* * * * *